(12) United States Patent
Wu et al.

(10) Patent No.: US 8,450,962 B2
(45) Date of Patent: May 28, 2013

(54) SYSTEM FOR CONTROLLING A MOTOR

(75) Inventors: Long Wu, Fargo, ND (US); Robert Shaw, Moorhead, MN (US)

(73) Assignee: Deere & Company, Moline, TX (US)

(*) Notice: Subject to any disclaimer, the term of this patent is extended or adjusted under 35 U.S.C. 154(b) by 306 days.

(21) Appl. No.: 13/036,953

(22) Filed: Feb. 28, 2011

(65) Prior Publication Data
US 2012/0217923 A1 Aug. 30, 2012

(51) Int. Cl.
*H02H 7/09* (2006.01)
*G05B 11/42* (2006.01)

(52) U.S. Cl.
USPC . 318/610; 318/609; 318/400.07; 318/400.22; 318/400.3

(58) Field of Classification Search
USPC .......... 318/609, 610, 400.02, 400.04, 400.07, 318/400.3
See application file for complete search history.

(56) References Cited

U.S. PATENT DOCUMENTS

| | | | |
|---|---|---|---|
| 4,023,083 A | 5/1977 | Plunkett | |
| 4,814,677 A | 3/1989 | Plunkett | |
| 4,958,117 A * | 9/1990 | Kerkman et al. | 318/805 |
| 5,140,248 A * | 8/1992 | Rowan et al. | 318/811 |
| 5,428,283 A | 6/1995 | Kalman | |
| 5,486,748 A | 1/1996 | Konrad | |
| 5,559,419 A * | 9/1996 | Jansen et al. | 318/808 |
| 5,565,752 A * | 10/1996 | Jansen et al. | 318/807 |
| 5,585,709 A * | 12/1996 | Jansen et al. | 318/807 |
| 5,914,582 A | 6/1999 | Takamoto | |
| 6,275,000 B1 | 8/2001 | Nishimura | |
| 7,045,988 B2 | 5/2006 | Ha | |
| 7,135,833 B2 * | 11/2006 | DeLange et al. | 318/762 |
| 7,157,878 B2 | 1/2007 | Collier-Hallman | |
| 7,622,877 B2 * | 11/2009 | Schulz et al. | 318/432 |
| 7,626,836 B2 * | 12/2009 | Leggate et al. | 363/41 |
| 7,642,737 B2 * | 1/2010 | Bae et al. | 318/400.02 |
| 7,733,044 B2 | 6/2010 | Nakamura et al. | |
| 7,768,803 B2 * | 8/2010 | Furutani et al. | 363/40 |
| 8,009,450 B2 * | 8/2011 | Royak et al. | 363/84 |
| 8,232,753 B2 * | 7/2012 | Shimada et al. | 318/400.09 |
| 8,278,865 B2 * | 10/2012 | Shimada et al. | 318/503 |
| 2006/0113929 A1 * | 6/2006 | DeLange et al. | 318/63 |
| 2006/0247829 A1 | 11/2006 | Sato | |
| 2008/0224649 A1 * | 9/2008 | Bae et al. | 318/801 |
| 2008/0224651 A1 * | 9/2008 | Schulz et al. | 318/812 |
| 2009/0129132 A1 * | 5/2009 | Furutani et al. | 363/95 |
| 2009/0244937 A1 * | 10/2009 | Liu | 363/46 |
| 2010/0054004 A1 * | 3/2010 | Royak et al. | 363/125 |

(Continued)

OTHER PUBLICATIONS

US 7,595,604, 09/2009, Tomigashi (withdrawn).

(Continued)

*Primary Examiner* — Paul Ip
(74) *Attorney, Agent, or Firm* — Brinks Hofer Gilson & Lione

(57) ABSTRACT

A control system for a motor includes a current regulation controller for generating a terminal voltage command. The terminal voltage command is used for converting a supply voltage to a three phase voltage to power a motor. The control system also includes a terminal voltage command feedback module for controlling the terminal voltage command. The terminal voltage command feedback module compares the terminal voltage command to a determined voltage limit of the supply voltage and generates a d-axis current adjustment command in accordance with the comparison. The d-axis current adjustment command is used for reducing the terminal voltage command below the determined voltage limit. The control system also includes a summer coupled with the terminal voltage command feedback module. The summer adds the d-axis current adjustment command to a d-axis current command received from a lookup table.

19 Claims, 7 Drawing Sheets

U.S. PATENT DOCUMENTS

2011/0074320 A1*  3/2011  Nakamura et al. ....... 318/400.02
2011/0080125 A1*  4/2011  Shimada et al. ......... 318/400.09

OTHER PUBLICATIONS

M. Elbuluk and M. Kankam, "Speed Sensorless Induction Motor Drives for Electrical Actuators: Schemes, Trends and Tradeoffs," National Aerospace and Electronics Conference cosponsored by IEEE, Wright-Patterson AFB, Dayton, OH, Jul. 14-18, 1997, 10 pp.

S. Van Haute et al., "Design and Control of a Permanent Magnet Synchronous Motor Drive for a Hybrid Electric Vehicle," Katholieke University, Leauven, Belgium, 6 pp.

* cited by examiner

SYSTEM FOR CONTROLLING A MOTOR

TECHNICAL FIELD

The present description relates to a system and method, generally referred to as a system, for controlling a motor.

BACKGROUND

Motors, such as alternating current machine like an interior permanent magnet (IPM) motor, a synchronous IPM machine (IPMSM), conventional induction machines, surface mounted PM machines (SMPM), other alternating current machines, or various other machines, may be controlled and/or powered in various ways. For example, motors may be powered using a battery, electricity, fossil fuels, motors, supply voltages, or other sources. Motors may be controlled manually and/or with the assistance of computer processors.

SUMMARY

A control system for a motor includes a current regulation controller for generating a terminal voltage command. The terminal voltage command is used for converting a supply voltage to a three phase voltage to power a motor. The control system also includes a terminal voltage command feedback module for controlling the terminal voltage command. The terminal voltage command feedback module compares the terminal voltage command to a determined voltage limit of the supply voltage and generates a d-axis current adjustment command in accordance with the comparison. The d-axis current adjustment command is used for reducing the terminal voltage command below the determined voltage limit. The control system also includes a summer coupled with the terminal voltage command feedback module. The summer adds the d-axis current adjustment command to a d-axis current command received from a lookup table.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

Figure 1:
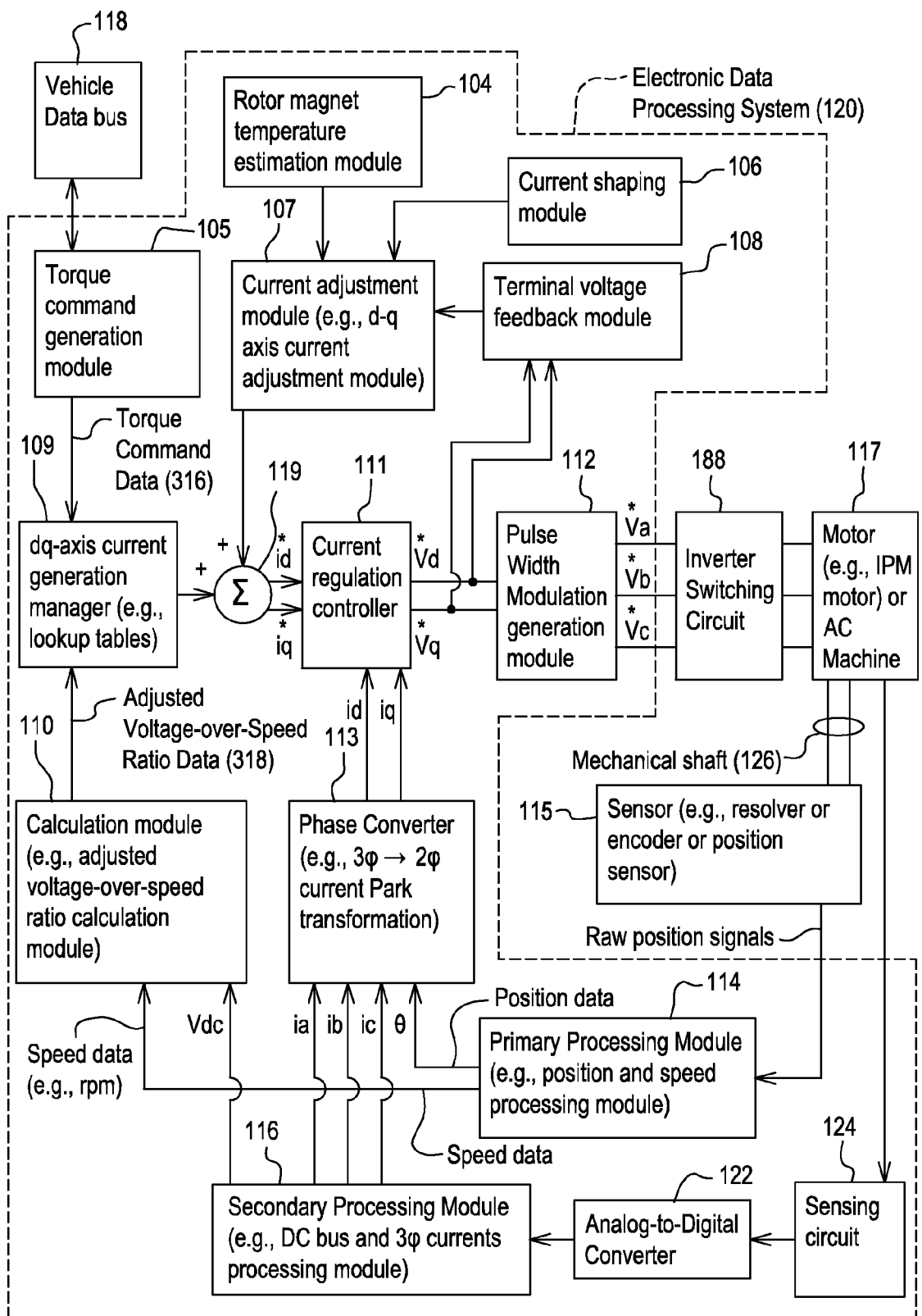
FIG. 1 is a block diagram a control system for controlling a motor.

In many motorized systems, precise control of the operation of motors may be desired, and in some situations, required. Precision control and operation of motors may require an understanding of the properties of the motor, as well as significant processing capabilities FIG. 1 illustrates a control system which may be used for controlling one or more motors, such as a motor 117. The control system may include one or more of an electronic data processing system 120, an inverter switching circuit 188, a sensor 115, and/or a vehicle data bus 118. More or less components or features may be included. The control system may refer to a combination of the electronic data processing system 120, the inverter switching circuit 188, and the sensor 115. In some systems, the control system may include the vehicle data bus 118. In other systems, the control system may only refer to the electronic data processing system 120 and/or the inverter switching circuit 188. The motor 117 and/or mechanical shaft 126 shown in FIG. 1 may or may not be considered a part of the control system. In some embodiments, the control system of FIG. 1, aside from the motor 117, may be referred to as an inverter or a motor controller.

The control system may be implemented and/or used to control one or more motors, such as, for example, a motor 117. The motor 117 may refer to various machines or motors, such as an alternating current machine like an interior permanent magnet (IPM) motor, a synchronous IPM machine (IPMSM), conventional induction machines, surface mounted PM machines (SMPM), other alternating current machines, or various other machines. In some embodiments, an IPMSM may have favorable advantages compared with conventional induction machines or surface mounted PM machines (SMPM) such as high efficiency, high power density, wide constant power operating region, and less maintenance, for instance. For simplicity, the controlled machine may be referred to as motor 117, but it should be appreciated that the disclosure is not limited to a motor.

Motor 117 may function and/or operate in various ways. For example, the motor 117 may be powered and/or controlled by a power supply. The power supply may, for example, be a voltage source (or source voltage) or a voltage supply (or supply voltage), such as a battery, electricity, bus voltage (such as direct current bus voltage), and/or other power, voltage, or current supplies.

The motor 117 may require, receive, be powered by, and/or operate based on a control signal. The control signal may, for example, be a current and/or voltage command, such as a three-phase current and/or voltage command. The control signal may physically power the motor 117, and/or may instruct a machine how to operate. The control signal may contain and/or deliver power from the power supply to the motor.

The control signal may, for example, be sent to the motor 117 by the inverter switching circuit 188, a generation module 112 such as a pulse width modulation generator, or other features or components. Other ways of operating and/or powering the motor 117 may be possible.

Motor 117 may be operable and/or function in various modes. For example, the motor 117 may be operable and/or function in a motoring mode. A motoring mode may refer to a mode where the motor 117 drives an attached mechanical shaft, such as mechanical shaft 126, or other device in a direction, with a speed, at an acceleration, and/or with a power. For example, a motoring mode may refer to a mode where the motor 117, attached to a larger machine such as a vehicle, drives, powers, propels, and/or accelerates the larger machine in a first direction. The motoring mode may refer to a mode where the motor 117 is consuming power from a power supply.

The motoring mode may be initiated by a command, such as a command from a user. For example, a user may instruct the control system and/or motor, though a user interface, to power the motor. An example of a user interface may be the controller 266 shown in FIG. 2 and discussed below. The control system may process the instruction and produce a signal and/or command to drive the motor.

Motor 117 may also operate in a braking mode, or a generating mode. A braking mode, or generating mode, may refer to a mode where the motor 117 is not driving and/or powering a machine. For example, a braking mode may exist or refer to where a motor 117 is running and no power signal and/or command is being sent to the motor 117. In the braking or generating mode, the motor 117 may be generating a charge and/or supplying electrical power and/or voltage to the power supply. For example, a rotating motor which may be idling may generate a signal and/or charge from its rotation which may be transmitted to the power source for the motor and/or control system, such as a dc bus voltage source. The braking mode may refer to a mode of operation where the motor is supplying power to the power source.

In some embodiments, a distinction between a motoring mode and a braking mode is that a motoring mode refers to a period where a motor 117 is consuming power from the power supply, and the braking mode (or generation mode) may refer to where the motor 117 are feeding power back into the power supply. Other modes of operating the motor 117 are possible.

As mentioned and shown in FIG. 1, the motor 117 may be connected to, coupled with, and/or in communication with the inverter switching circuit 188.

The inverter switching circuit 188 may receive command signals from the electronic data processing system 120, such as from the generation module 112. For example, the generation module 112 may provide inputs to a driver stage within the inverter circuit 188. Such command signals may be generated, and/or transmitted by the generation module 112 to the inverter switching circuit 188 to be processed and sent to the motor 117 for controlling and/or driving the motor 117. In some systems, such commands may be referred to as voltage commands, or three phase voltage commands.

The inverter switching circuit 188 may be powered by a power supply. In some configurations, the inverter switching circuit 188 and/or the power supply to the inverter switching circuit 188 may be considered the power supply for the motor 117. In some configurations, the power supply may be a direct current (DC) voltage bus. The power supply may alternatively be a voltage source (or source voltage) or a voltage supply (or supply voltage), such as a battery, electricity, another bus voltage, and/or other power, voltage, or current supplies. Other power supplies and configuration are possible.

The inverter switching circuit 188 may include power electronics, such as switching semiconductors, which may function and/or be used to generate, modify and/or control pulse-width modulated signals or other alternating current signals, such as pulse, square wave, sinusoidal, or other waveforms. The inverter switching circuit 188 may include a semiconductor drive circuit that drives or controls switching semiconductors (e.g., insulated gate bipolar transistors (IGBT) or other power transistors) to output the generated and/or modified control signals to the motor 117.

As mentioned, the inverter switching circuit 188 may receive a voltage command, or other command signal, from a generation module 112. The inverter switching circuit 188 may provide voltage, current, and/or power signals or commands based on the received command signals to the motor 117. For example, the inverter switching circuit 188 may receive commands and/or command signals from the generation module 112, may transform supply voltage supplied to and/or fed to the inverter switching circuit 188 into a voltage command and/or voltage signal, and/or may transmit or otherwise send the voltage command and/or voltage signal to the motor 117. The command and/or signal generated by the inverter switching circuit 188 may be, and/or may also be referred to as, a voltage command, a terminal voltage command, or a dq-axis voltage command, or by the symbol ($v_{term}$*).

Control signals or commands provided by the inverter switching circuit 188 to the motor 117 may control and/or drive the motor 117. For example, an output stage, port, or transmission of the inverter switching circuit 188 may provide and/or transmit a pulse-width modulated voltage waveform or other voltage signal for control of the motor. Control signals and/or commands provided by the inverter switching circuit 188 to the motor 117 may or may not be based on and/or related to the command signals received by the inverter switching circuit 188 from the generation module 112.

The motor 117 may be attached to, connected with, and/or in communication with a mechanical shaft 126. The mechanical shaft 126 may be configured and/or attached to the motor 117 such that when the motor 117 is running, the mechanical shaft 126 may rotate or otherwise be displaced. As an example, a motor 117 may drive a rotation of the mechanical shaft 126. In this way, an object attached to an end of the mechanical shaft, such as a wheel, may be rotated by the motor 117. The mechanical shaft 126 may be a motor shaft, or various other shafts.

The mechanical shaft 126 may be various shapes, sizes, and/or dimensions, and may be made of various materials. For example, a mechanical shaft 126 may be any mechanical shaft configured and/or capable of being used with a motor 117, such as a shaft in a vehicle attached to a vehicle motor. Other mechanical shafts may be possible.

The motor 117 may also be associated with a sensor 115. The sensor 115 may be, and/or may include a position sensor, a brushless resolver, another resolver, an encoder position sensor, a speed sensor, a shaft or rotor speed detector, a digital position encoder, a direct current motor, an optical encoder, a magnetic field sensor such as a Hall Effect sensor, a magneto-resistive sensor, or various combination of sensors, encoders, or encoders. An output of the sensor may include analog signals, digital signals, or both. Other sensors may be possible.

Sensor 115 may be connected, attached to, and/or in communication with the mechanical shaft 126 and/or the motor 117. For example, the sensor 115 may be mounted on or integral with the mechanical shaft 126. This may be useful in systems where a rotation or displacement of the mechanical shaft can be easily and/or directly correlated with one or more properties of the motor 117. Alternatively, the sensor 115 may be connected directly to the motor and/or other components attached to or in communication with the motor. In addition, more than one sensor 115 may be used in some systems. For example, one sensor 115 may be used to sense data for each phase of a three phase motor. Various configurations are possible.

The sensor 115 may be used to monitor, measure, and/or estimate one or more properties of the motor 117 and/or the mechanical shaft 126. Where the sensor 115 is connected or attached to the mechanical shaft, the sensor 115 may, for example, monitor, measure, and/or estimate properties of the mechanical shaft 126, such as an angular position of the mechanical shaft 126, a speed or velocity of the mechanical shaft 126, and/or a direction of rotation of the mechanical shaft 126. Alternatively, the sensor 115 may measure one or more properties of a motor 117 directly, such as, for example, an angular position of the motor 117, a speed or velocity of the motor 117, and/or a direction of rotation of the motor 117.

In some configurations, the sensor 115 includes a position sensor, where position data and associated time data are processed to determine speed or velocity data for the mechanical shaft 126. In other configurations, the sensor 115 may include a speed sensor, or the combination of a speed sensor and an integrator to determine the position of the motor shaft. In other configurations, the sensor 115 may include an auxiliary, compact direct current generator that is coupled mechanically to the mechanical shaft 126 of the motor 117 to determine speed of the motor shaft 126. In these configurations, the direct current generator may produce an output voltage proportional to the rotational speed of the motor shaft 126. In other configurations, the sensor 115 may include an optical encoder with an optical source that transmits a signal toward a rotating object coupled to the mechanical shaft 126 and receives a reflected or diffracted signal at an optical detector. In these configurations, the frequency of received signal pulses (e.g., square waves) may be proportional to a speed of the mechanical shaft 126. In other configurations, the sensor 115 may include a resolver with a first winding and a second winding, where the first winding is fed with an alternating current, where the voltage induced in the second winding varies with the frequency of rotation of the rotor. Various other configurations are possible.

The sensor 115 may output a signal based on properties and/or signals monitored, measured, and/or estimated from the attachment or connection to the mechanical shaft 126 and/or the motor 117. The output of the sensor 115 may include feedback data such as current feedback data like $i_a$, $i_b$, $i_c$, raw signals, such as raw position or velocity signals, or other feedback or raw data. Other possible feedback data includes, but is not limited to, winding temperature readings, semiconductor temperature readings of the inverter circuit 188, three phase voltage or current data, or other thermal or performance information for the motor 117. Alternatively or in addition, the output of the sensor 115 may include processed signals. The output of the sensor 115 may be an analog or digital signal.

In some embodiments, the sensor 115 may be coupled to an analog-to-digital converter (not shown) that may convert analog position data or velocity data to digital position or velocity data respectively. Such an analog-to-digital converter may be internal or external to the control system and/or electronic data processing system 120. In other embodiments, the sensor 115 may provide a digital data output of position data or velocity data, such as position data or velocity data for the mechanical shaft 126 or the rotor.

The output of a sensor 115 may be transmitted, sent, passed, and/or otherwise communicated to the electronic data processing system 120. In some systems, the output may be coupled to the primary processing module 114 of the electronic data processing system 120. In embodiments where the sensor 115 is coupled to an analog-to-digital converter (not shown), the output of the analog-to-digital converter may be transmitted, sent, passed, and/or otherwise communicated to the primary processing module 114.

The control system may include an electronic data processing system 120. The electronic data processing system 120 is indicated by the dashed lines in FIG. 1 and is shown in greater detail in FIG. 2.

The electronic data processing system 120 may be used to support storing, processing or execution of software instructions of one or more software modules. The electronic data processing system 120 may include electronic modules, software modules, hardware modules, or combinations of each.

The electronic data processing system 120 may include one or more elements, features, and/or components, such as a sensing circuit 124, an analog-to-digital converter 122, a primary processing module 114, a secondary processing module 116, a phase converter 113, a calculation module 110, a dq-axis current generation manager 109, a summer or summation module 119, a current shaping module 106, a rotor magnet temperature estimation module 104, a terminal voltage feedback module 108, a current adjustment module 107, a torque command generation module 105, a current regulation controller 111, and/or a generation module 112. The electronic data processing system may also or alternatively include a digital processing system and/or a field-programmable gate array. One or more of the components of the electronic data processing system 120 may be combined into each other, and/or may be divided among other components. More or less components may be included with the electronic data processing system 120. For example, in some systems, the sensing circuit 124 and the analog-to-digital converter 122 may be external to the electronic data processing system 120. In some embodiments, the electronic data processing system 120 of FIG. 1 may represent more than one electronic data processing system, some or all of which may be connected, attached, and/or in communication with each other.

As mentioned, an output of the sensor 115 may be sent, transmitted, and/or otherwise communicated to the electronic data processing system 120. For example, an output of the sensor 115 may be sent to the primary processing module 114.

The primary processing module 114, which may be a position and/or speed processing module, may process the output from the sensor 115. The primary processing module 114 may process, determine, calculate, estimate, and/or otherwise identify position data ($\theta$) and/or speed data for the motor 117. In some systems, the sensor 115 on the motor 117 may provide position data ($\theta$) for the motor shaft 126, and the primary processing module 114 may convert the position data from the sensor 115 into speed data.

The position data ($\theta$) for the motor 117 may refer to a position of the mechanical shaft 126 and/or a position of the motor 117. The position data ($\theta$) may be expressed as and/or represent an angle, an offset angle, a phase, or various other angles or positions. The speed data may refer to a speed of the motor 117. The speed data may be expressed as, and/or refer to, revolutions per minute of the mechanical shaft 126, or may be expressed and/or refer to various other speeds. The position data ($\theta$) and/or speed data may be processed, determined, calculated, estimated, and/or otherwise identified by the primary processing module 114 based on, or as a result of, the output received by the primary processing module 114 from the sensor 115.

The primary processing module 114 may output the position data ($\theta$) and/or the speed data to one or more components of the control system. For example, the primary processing module 114 may output the position data ($\theta$) to the phase converter 113, and/or may output the speed data to the calculation module 110. Alternatively the primary processing module 114 may output one or both of the position data (θ) and/or speed data for the motor 117 to various other components of the control system.

In addition to the sensor 115 previously described, the control system may also include a sensing circuit 124. The sensing circuit 124 may have inputs which may be coupled to the motor 117. The inputs of the sensing circuit 124 may be used for and/or operable to monitor, measure, and/or estimate properties of the motor 117. For example, the inputs of the sensing circuit 124 may be coupled to terminals of the motor 117. The input of the sensing circuit 124 may be used to sense a measured current of the motor 117. For example, the sensing circuit 124 may be associated with the motor 117 for measuring three phase currents, such as a current applied to the windings of the motor 117, back EMF induced into the windings, or both. The sensing circuit 124 may also, or alternatively, be used to measure a voltage level of the motor 117, such as a direct current voltage level of the motor 117. Alternatively or in addition, the sensing circuit 124 may be used to measure a voltage supply level used to power the motor 117 and/or used to power the inverter switching circuit 188, such as a high voltage DC data bus which provides DC power to the inverter switching circuit 188. Other configurations are possible. Additionally, other properties of the motor 117 may be monitored, measured, and/or estimated.

The sensing circuit 124 is shown in FIG. 1 as being a part of the electronic data processing system 120. Alternatively, the sensing circuit 124 may be a component separate from the electronic data processing system 120, and/or may be externally attached, connected, and/or in communication with the electronic data processing system 120.

The sensing circuit 124 may transmit and/or output signals sensed from the motor 117 to an analog-to-digital converter 122 in the electronic data processing system 120. These signals may, for example, include measured three phase currents and/or a voltage level of a power supply, such as the direct current (DC) data bus voltage powering the inverter switching circuit 188.

The analog-to-digital converter 122 is shown in FIG. 1 as being a part of the electronic data processing system 120. Alternatively, the analog-to-digital converter 122 may be a component separate from the electronic data processing system 120, and/or may be externally attached, connected, and/or in communication with the electronic data processing system 120.

The analog-to-digital converter 122 may receive an output of the sensing circuit 124. The analog-to-digital converter 122 may transform and/or digitize an analog output from the sensing circuit 124 into a digital signal which may then be further processed by the electronic data processing system 120.

The analog-to-digital converter 122 may be attached, connected, coupled to, and/or in communication with the secondary processing module 116. An output from the analog-to-digital converter 122, such as the digitized output from the sensing circuit 124, may be transmitted to the secondary processing module 116.

In some systems, the analog-to-digital converter 122 may not be necessary or included. For example, in systems where an output of the sensing circuit 124 is a digital signal, an analog-to-digital converter 122 may not be useful.

The secondary processing module 116, which may in some systems be referred to as a "direct current (DC) bus and three phase current processing module," may process, determine, calculate, estimate, or otherwise identify information from the signals received from the analog-to-digital converter 122.

For example, the secondary processing module 116 may determine or identify three phase currents ($i_a$, $i_b$, $i_c$) from the signal received from the sensing circuit 124. These three phase currents ($i_a$, $i_b$, $i_c$) may represent and/or relate to the actual three phase currents generated by the motor 117. Alternatively or in addition, the secondary processing module 116 may determine or identify the direct current (DC) data bus voltage powering the inverter switching circuit 188.

The secondary processing module 116 may include one or more digital signal processors, field programmable gate arrays, other processors, and/or various other components. In addition or alternatively, the secondary processing module 116 may be included in one or more digital signal processors, field programmable gate arrays, other processors, and/or various other components.

The secondary processing module 116 may output the three phase currents ($i_a$, $i_b$, $i_c$) and/or direct current voltage to one or more components of the control system and/or electronic data processing system 120. For example, the secondary processing module 116 may output each of the three phase currents ($i_a$, $i_b$, $i_c$) to the phase converter 113, and may output the direct current voltage ($V_{DC}$) to the calculation module 110. Alternatively the secondary processing module 116 may output one or both of the three phase currents ($i_a$, $i_b$, $i_c$) and/or direct current voltage ($V_{DC}$) to various other components of the control system.

The phase converter 113, which may in some systems be referred to as a three-phase to two-phase current Park transformation module, may receive outputs from one or both of the primary processing module 114 and the secondary processing module 116. For example, as in FIG. 1, the phase converter may receive the three phase currents ($i_a$, $i_b$, $i_c$) of the motor from the secondary processing module 116, as well as position data (A) from the primary processing module 114. Other inputs are possible.

The phase converter 113 may convert the three phase currents ($i_a$, $i_b$, $i_c$) and position data (θ) from a three phase digital representation of measured current in the motor 117 into a corresponding two phase digital representation of the measured current. The two phase representation of the digital current may be a current signal represented in a dq-axis, and/or may have a d-axis current component and a q-axis current component. For example, the phase converter 113 may apply a Park transformation or other conversion equations to convert the measured three-phase representations of current ($i_a$, $i_b$, $i_c$) into two-phase representations of current ($i_d$, $i_q$) using the current data from the secondary processing module 116 and the position data from the primary processing module 114 and/or sensor 115.

The two phase representation of current ($i_d$, $i_q$) may be d-q axis current, and may refer to a direct axis current ($i_d$) and a quadrature axis current ($i_q$), as applicable in the context of vector-controlled alternating current machines, such as the motor 117.

The two-phase current ($i_d$, $i_q$) may be output from the phase converter 113 module another component of the control system and/or electronic data processing system 120, such as the current regulation controller 111. Other outputs from the phase converter 113 are possible, and may be output to other components of the control system and/or electronic data processing system 120.

The phase converter 113 may include one or more digital signal processors, field programmable gate arrays, other processors, and/or various other components. In addition or alternatively, the phase converter 113 may be included in one or more digital signal processors, field programmable gate arrays, other processors, and/or various other components.

For example, in some systems, the phase converter 113 and the secondary processing system 116, or the functionality of the phase converter 113 and/or the secondary processing system 116, may be included in a combination of a digital signal processor and a field programmable gate array. Other configurations may be possible.

The electronic data processing system 120 may include a calculation module 110. The calculation module 110 may receive outputs from the primary processing module 114 and the secondary processing module 116. For example, the primary processing module 114 may provide speed data (such as the revolutions per minute of the mechanical shaft 126). Additionally or alternatively, the secondary processing module 116 may provide a measured level of direct current voltage.

The calculation module 110 may process, determine, calculate, estimate, or otherwise identify a voltage-over-speed ratio, or other data, from the received outputs of the processing module 114 and/or the secondary processing module 116. For example, the calculation module 110 may divide the received direct current voltage by the received speed data to determine a voltage-over-speed ratio, such as the adjusted voltage-over-speed ratio 318. Other calculations or comparisons are possible.

Additionally, the direct current voltage level of the power supply that supplies the inverter circuit 188 with electrical energy may fluctuate or vary because of various factors, including, but not limited to, ambient temperature, battery condition, battery charge state, battery resistance or reactance, fuel cell state (if applicable), motor load conditions, respective motor torque and corresponding operational speed, and vehicle electrical loads (e.g., electrically driven air-conditioning compressor). The calculation module 110 may adjust and/or impact current commands generated by the d-q axis current generation manager 109 to compensate for fluctuation or variation in the direct current bus voltage, among other things. Such adjustments may be made, implemented, and/or reflected in an adjusted voltage-over-speed ratio 318.

One or more outputs of the calculation module 110 may be transmitted, output, fed, sent, and/or otherwise communicated to the dq-axis current generation manager 109.

The torque command generation module 105 may also, or alternatively, be attached, connected, coupled, and/or otherwise in communication with the dq-axis current generation manager 109.

The torque command generation module 105 may itself receive an input, such as an input from the vehicle data bus 118. The vehicle data bus 118 may, for example, be a controller area network (CAN) or other network. The vehicle data bus may in some systems include wired networks, wireless networks, or combinations thereof. Further, the network may be a public network, such as the Internet, a private network, such as an intranet, or combinations thereof, and may utilize a variety of networking protocols now available or later developed including, but not limited to TCP/IP based networking protocols.

The torque command generation module 105 may take the received signal or torque command from the vehicle data bus 118, and may calculate, identify, estimate, and/or generate torque command data 316 based on the received signal. For example, where the received signal indicates that an acceleration pedal has been pressed, the torque command generation module 105 may generate a command and/or torque command data 316 for increased torque and/or power to be sent to the motor 117. Other received signals and commands are possible.

The torque command generation module 105 may include a lookup table which the torque command generation module 105 may use to compare and/or look up an input command received by the torque command generation module 105 to identify and/or generate the resulting torque command data 316 in response to the received input command. In other systems, the torque command generation module 105 may process the received input, and may output the processed signal to the dq-axis current generation manager 109, without using or referring to a lookup table, such as by using one or more algorithms and/or rules based logic.

The torque command generation module 105 may be output, transmitted, and/or otherwise communicated to the dq-axis current generation manager 109.

The dq-axis current generation manager 109, which may also be referred to and/or include dq-axis current generation look-up tables, may receive the torque command data 316 from the torque command generation module 105. The dq-axis current generation manager 109 may also or alternatively receive adjusted voltage-over-speed ratio data 318 from the calculation module 110.

The dq-axis current generation manager 109 may use the received torque command data 316 and/or voltage-over-speed data 318 to look up, determine, select, and/or generate direct axis current command data (such as a d-axis current command ($i_d$*)) and/or quadrature axis current command data (such as a q-axis current command ($i_q$*)). For example, the dq-axis current generation manager 109 may select and/or determine the direct axis current command and the quadrature axis current command by accessing one or more of the following: (1) a look-up table, database or other data structure that relates respective torque command data 316 and/or adjusted voltage-over-speed data 318 to corresponding direct and quadrature axes currents ($i_d$*, $i_q$*), (2) a set of quadratic equations or linear equations that relate respective torque command data 316 and/or adjusted voltage-over-speed data 318 to corresponding direct and quadrature axes currents ($i_d$*, $i_q$*), and/or (3) a set of rules (such as if-then rules) and/or logic that relate respective torque command data 316 and/or adjusted voltages-over-speed data 318 to corresponding direct and quadrature axes currents ($i_d$*, $i_q$*). Where the dq-axis current generation module 109 uses a lookup table, the lookup table may be a part of the dq-axis current generation module 109, and/or may be accessible to the dq-axis current generation module 109. The lookup table may, for example, be a three dimensional lookup table.

The output of the dq-axis current generation manager 109 may be sent, fed, transmitted, and/or otherwise communicated to a summer 119. While FIG. 1 shows a system with a summer 119 which may sum an output of the dq-axis current generation manager 109 and an output of the current adjustment module 107, in other systems where the current adjustment module 107 and/or feedback controls are not desired, required, or enabled, the output from the current generation manager 109 may be fed directly to the current regulation controller 111.

An output of the current adjustment module 107 may reflect one or more adjustment factors, such as one or more adjustment factors or commands determined and/or transmitted the rotor magnet temperature estimation module 104, the current shaping module 106, and/or the terminal voltage feedback module 108.

The rotor magnet temperature estimation module 104 may be connected to, attached to, in communication with, coupled to, monitor, or otherwise estimate or determine the temperature of one or more components of the motor 117. For example, the rotor magnet temperature estimation module 104 may estimate or determine the temperature of a rotor permanent magnet or magnets.

For example, in some embodiments, the rotor magnet temperature estimation module 104 may estimate the temperature of the rotor magnets from one or more sensors located on the stator, in thermal communication with the stator, or secured to the housing of the motor 117. In other embodiments, the rotor magnet temperature estimation module 104 may be replaced with a temperature detector (e.g., a thermistor and wireless transmitter like infrared thermal sensor) mounted on the rotor or the magnet, where the detector may provide a signal, such as a wireless signal, which may be indicative of the temperature of the magnet or magnets.

In response to and/or based on a measured temperature and/or estimated change in rotor temperature, the rotor magnet temperature estimation module 104 may generate an adjustment of the q-axis current command and/or the d-axis current command. The adjustment may be in the form of an adjustment current command, an adjustment signal, adjustment factor, and/or adjustment data to be sent to the current adjustment module 107. The adjustment may be sent, fed, transmitted, and/or otherwise communicated to the current adjustment module 107.

Alternatively or additionally, the system may include a current shaping module 106. The current shaping module 106 may, for example, measure, calculate, estimate, monitor, and/or otherwise identify one or more factors or features of the motor 117. For example, the current shaping module 106 may identify a torque load on the motor 117 and/or a speed of the motor 117. Other factors and/or features are possible.

The current shaping module 106 may determine a correction or adjustment of the quadrature axis (q-axis) current command and the direct axis (d-axis) current command based on one or more of the factors or features, such as the torque load on the motor 117 and speed of the motor 117. The correction and/or adjustment may be in the form of an adjustment current command, an adjustment signal, adjustment factor, and/or adjustment data to be sent to the current adjustment module 107. This correction and/or adjustment may be sent, fed, transmitted, and/or otherwise communicated to the current adjustment module 107.

Alternatively or additionally, the system may include a terminal voltage feedback module 108. The terminal voltage feedback module 108 may, for example, calculate a voltage supply limit, such as by sampling the voltage supply magnitude each PWM cycle, and applying a limit coefficient to the voltage supply, such as $1/\sqrt{3}$, or $0.95/\sqrt{3}$, or other coefficients. The terminal voltage feedback module 108 may also sample the terminal voltage command from the current regulation controller 111. The terminal voltage feedback module 108 may compare the terminal voltage command to the voltage limit, and may generate an adjustment command to be sent to the command generation module 107, whenever the terminal voltage command is greater than (or alternatively, greater than or equal to) the voltage limit. This adjustment command may, for example, be a d-axis current adjustment command, and may be intended to reduce the terminal voltage command generated by the current regulation controller 111.

The correction and/or adjustment may be in the form of an adjustment current command, an adjustment signal, an adjustment factor, and/or adjustment data to be sent to the current adjustment module 107. The adjustment command from the terminal voltage feedback module 108 may be sent, fed, transmitted, and/or otherwise communicated to the current adjustment module 107. The terminal voltage feedback module 108 may be discussed in greater detail below with respect to FIGS. 3-7.

As mentioned, one or more of the rotor magnet temperature estimation module 104, the current shaping module 106, and the terminal voltage feedback module 108 may be coupled to and/or are capable of communicating with the dq-axis current adjustment module 107.

The current adjustment module 107 may gather the adjustment signals, adjustment factors, adjustment commands, and/or adjustment data from one or more of the rotor magnet temperature estimation module 104, the current shaping module 106, and the terminal voltage feedback module 108. The current adjustment module 107 may add, aggregate, assimilate, compile, and/or otherwise account for the adjustment data and/or commands from each of the rotor magnet temperature estimation module 104, the current shaping module 106, and the terminal voltage feedback module 108, and using this data, may generate and/or create a complete or total adjustment command. Where the gathered adjustment data includes adjustment commands, the current adjustment module 107 may aggregate, sum, and/or combine the adjustment commands together to form one adjustment command. In other circumstances, the current adjustment module 107 may need to further process the adjustment commands to obtain a signal which may be summed at the summation block 119. This complete or total adjustment command may also be referred to, for example, as an adjustment command, an adjusted d-axis current command, a d-axis current adjustment command, or a d-axis current adjustment.

The current adjustment module 107 may provide this d-axis current adjustment data, such as the adjusted d-axis current command, to adjust the direct axis current command data based on input data from the rotor magnet temperature estimation module 104, the current shaping module 106, and terminal voltage feedback module 108.

In turn, the current adjustment module 107 may communicate with the dq-axis current generation manager 109 or the summer 119. For example, the current adjustment module 107 may send, feed, transmit, and/or otherwise communicate the d-axis current adjustment command to the summer 119, which may add the d-axis current adjustment command together with an output from the dq-axis current generation manager 109.

While FIG. 1 shows each of the rotor magnet temperature estimation module 104, the current shaping module 106, and the terminal voltage feedback module 108 as being connected to the current adjustment module 107, and one output from the current adjustment module 107 being fed to the summation block 119, other configurations are possible. For example, where the rotor magnet temperature estimation module 104 and the current shaping module 106 are not included or are disabled, an output from the terminal voltage feedback module 108 may be transmitted directly to the summer 119. Various other configurations are possible.

The summer 119, which in some systems may be referred to as a summation block or summation module, may receive the dq-current command from the dq-axis current generation manager 109. The summer 119 may also or alternatively receive the d-axis current adjustment command from the current adjustment module 107. The summer 119 may add the d-axis current adjustment command to the dq-current command, and may output an adjusted current command. The adjusted current command may be represented as a two-phase current command ($i_d^*$, $i_q^*$).

While FIG. 1 depicts the dq-axis current adjustment command being transmitted to the summer 119, in some systems, the dq-axis current adjustment command may be transmitted directly to the dq-axis current generation manager 109, and/or may be used by the dq-axis current generation manager to select a proper current command to be used in controlling and/or powering the motor 117.

The adjusted current command from the summer 119 may be sent, fed, transmitted, and/or otherwise communicated to the current regulation controller 111. As mentioned, the current regulation controller 111 may also receive the actual two-phase currents ($i_d$, $i_q$) from the phase converter 113.

The current regulation controller 111 may process the respective dq-axis current commands (e.g., $i_d^*$ and $i_q^*$) and actual dq-axis currents (e.g., $i_d$ and $i_q$) received, and may output one or more corresponding dq-axis voltage commands (e.g., $v_d^*$ and $v_q^*$ commands) based on the processed inputs. These dq-axis voltage commands ($v_d^*$, $v_q^*$) may be two-phase voltage commands, and may be sent, fed, transmitted, and/or otherwise communicated to the generation module 112.

The generation module 112, which may be a pulse-width modulation (PWM) generation module, such as a space vector PWM generation module, may receive the voltage commands, such as the two-phase voltage commands ($v_d^*$, $v_q^*$), from the current regulation controller 111. The generation module may generate a three phase voltage command based on the received terminal voltage command. For example, the generation module 112 may convert the direct axis voltage and quadrature axis voltage commands ($v_d^*$, $v_q^*$) from two phase data representations into three phase representations, such as $v_a^*$, $v_b^*$ and $v_c^*$. The three phase representations $v_a^*$, $v_b^*$ and $v_c^*$ may, in some systems, represent a desired voltage to control the motor 117.

The three phase voltage command representations ($v_a^*$, $v_b^*$, and $v_c^*$) may be transmitted, fed, sent, and/or communicated to the inverter switching circuit 188. The inverter switching circuit 188 may generate the three phase voltage commands for controlling the motor 117. The three phase voltage commands may be based on the three phase voltage command signals ($v_a^*$, $v_b^*$, and $v_c^*$) received from the generation module 112. In at least this way, the control system may be operated to control the motor 117.

In some systems and/or embodiments, the generation module 112 may be powered by the same power supply previously discussed with respect to the inverter switching circuit 188. In some systems, the generation module 112 and the inverter switching circuit 188 may be part of the same component, and may receive the two phase voltage command from the current regulation controller 111 and may output a three phase voltage command to the motor 117 to drive the motor 117.

Figure 2:
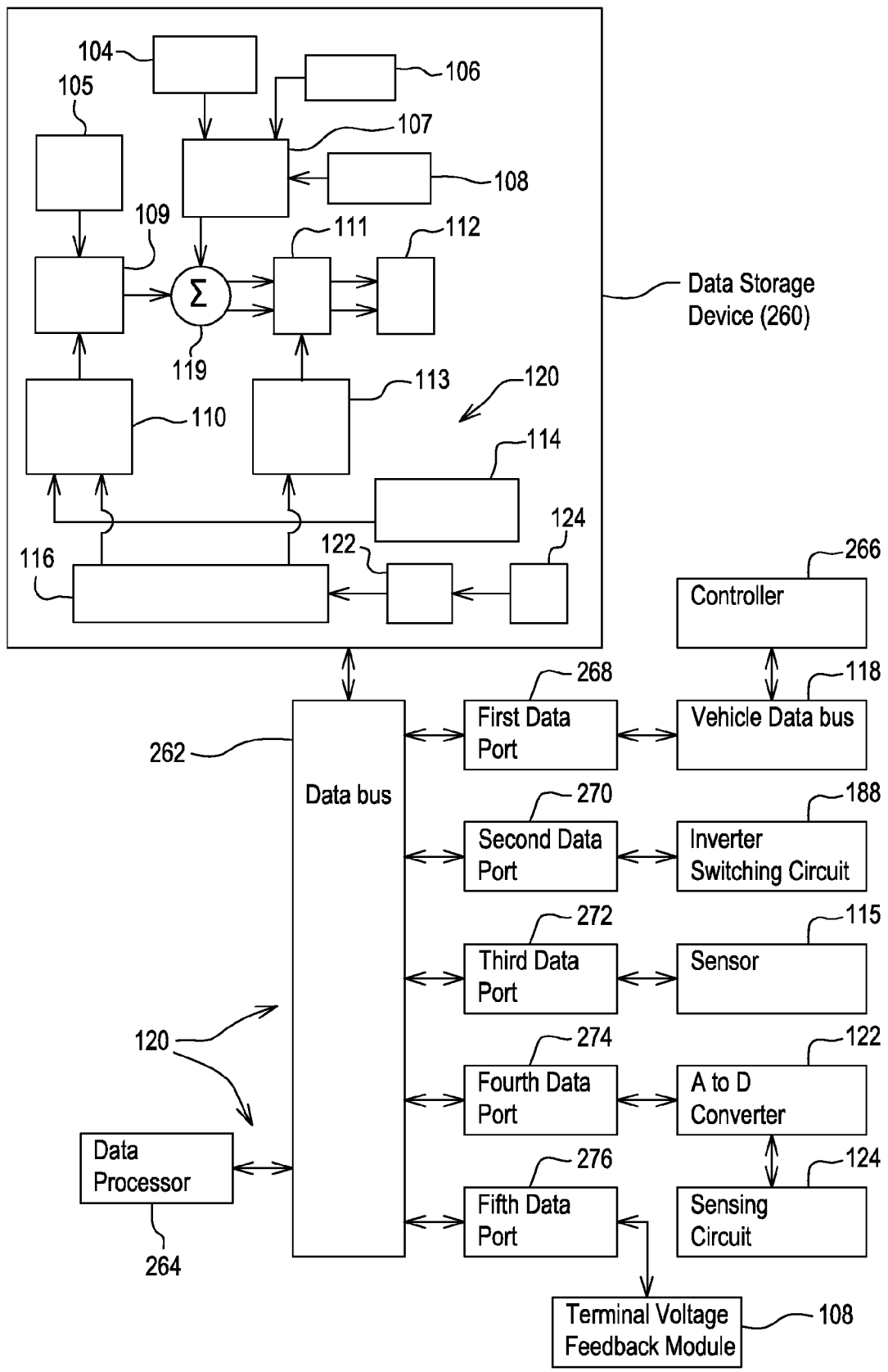
FIG. 2 is a block diagram of an electronic data processing system useful with a control system for controlling a motor.

FIG. 2 illustrates an example of the control system. The control system of FIG. 2 may include an electronic data processor 264, a data bus 262, a data storage device 260, and one or more data ports (268, 270, 272, 274 and 276). The control system of FIG. 2 may include all or part of the electronic data processing system 120 of FIG. 1. The data processor 264, the data storage device 260 and one or more data ports may be coupled to the data bus 262 to support communications of data between or among the data processor 264, the data storage device 260 and one or more data ports. Like numbered components in FIG. 2 may be constructed and/or function in the same or similar manner as the same components in FIG. 1.

The control system, the electronic data processing system 120 and/or various components of the electronic data processing system 120 may be or may include one or more computing devices of various kinds, such as a computer system. The computer system can include a set of instructions that can be executed to cause the computer system to perform any one or more of the methods or computer based functions disclosed herein. The computer system may operate as a standalone device or may be connected, e.g., using a network, to other computer systems or peripheral devices. The computer system may include computers, processor, and/or other programmable apparatus. Actions of the computers, processor, and/or other programmable apparatus may be directed by computer programs, applications and/or other forms of software. Memory in, used with, or used by the control system, such as computer-readable memory, may be used to direct the computers, processor, and/or other programmable apparatus to function in a particular manner when used by the computers, processor, and/or other programmable apparatus. Methods of controlling motors, such as described by flowcharts herein, may be performed as a series of operational steps on or with the aid of the computers, processor, and/or other programmable apparatus.

In a networked deployment, the computer system may operate in the capacity of a server or as a client user computer in a server-client user network environment. The computer system may include a processor, e.g., a central processing unit (CPU), a graphics processing unit (GPU), or both. For example, the control system and/or electronic data processing system 120 may include the data processor 264 shown in FIG. 2.

The data processor 264 may be a component in a variety of systems. For example, the processor may be part of a standard personal computer or a workstation. The processor may be one or more general processors, digital signal processors, application specific integrated circuits, field programmable gate arrays, servers, networks, digital circuits, analog circuits, combinations thereof, or other now known or later developed devices for analyzing and processing data. The data processor 264 may include one or more of an electronic data processor, a microprocessor, a microcontroller, a programmable logic array, a logic circuit, an arithmetic logic unit, an application specific integrated circuit, a digital signal processor, a proportional-integral-derivative (PID) controller, or another data processing device. The processor may implement a software program, such as code generated manually (i.e., programmed).

The data processor 264 may be coupled to the electronic data processing system 120, one or more of the ports 268, 270, 272, 274, and 276, and/or the data storage device 260. The data processor 264 may conduct or assist with various processing implemented in the electronic data processing system 120. For example, logic and/or software implementing features and functions of the electronic data processing system 120 may be partially or entirely executed by the data processor 264.

The data processor 264 may be connected to the data bus 262. The data bus 262 may include one or more data buses. The data bus 262 may be any of a variety of data buses or combinations of data buses. One or more components of the control system may be coupled to the data bus 262, such as to facilitate and/or support communication between components. For example, the data processor 264, the data storage device 260 and one or more data ports (268, 270, 272, 274, and 276) are coupled to the data bus 262 to support communications of data between or among the data processor 264, the data storage device 260 and one or more data ports.

The data storage device 260 may store and/or include all or part of the electronic data processing system 120. For example, in FIG. 2, the sensing circuit 124, the analog-to-digital converter 122, the primary processing module 114, the secondary processing module 116, the phase converter 113, the calculation module 110, the dq-axis current generation manager 109, the summer or summation module 119, the current shaping module 106, the rotor magnet temperature estimation module 104, the terminal voltage feedback module 108, the current adjustment module 107, the torque command generation module 105, the current regulation controller 111, and/or the generation module 112 may be included in and/or in communication with the data storage device 260. Fewer or more components may be included with the data storage device 260. Additionally or alternatively, more or less data storage devices 260 may be used for all or part of the electronic data processing system 120.

The data storage device 260 may comprise any magnetic, electronic, or optical device for storing data. For example, the data storage device 260 may comprise an electronic data storage device, an electronic memory, non-volatile electronic random access memory, one or more electronic data registers, data latches, a magnetic disc drive, a hard disc drive, an optical disc drive, or the like.

The data storage device 260 may include a memory. The memory may be a main memory, a static memory, or a dynamic memory. The memory may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory includes a cache or random access memory for the processor. In alternative embodiments, the memory is separate from the processor, such as a cache memory of a processor, the system memory, or other memory. The memory may be an external storage device or database for storing data. Examples include a hard drive, compact disc ("CD"), digital video disc ("DVD"), memory card, memory stick, floppy disc, universal serial bus ("USB") memory device, or any other device operative to store data. The memory is operable to store instructions executable by the processor. The functions, acts or tasks illustrated in the figures or described herein may be performed by the programmed processor executing the instructions stored in the memory. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The term "computer-readable medium" may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed herein. The "computer-readable medium" may be non-transitory, and may be tangible.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The data ports 268, 270, 272, 274, and/or 276 may represent inputs, ports, and/or other connections to the data bus 262, data storage device 260, and/or the data processor 264. The data ports 268, 270, 272, 274, and/or 276 of the control system in FIG. 2 may also, or alternatively, be coupled to one or more components of the motor 117, the control system, user interfaces, displays, sensors, converters, and/or other circuits. Each data port may comprise a transceiver and buffer memory, for example. In some systems, each data port may comprise any serial or parallel input/output port.

For example, a controller 266, such as a pedal to a vehicle or other user interface, may be connected, attached, coupled to, and/or in communication with a vehicle data bus 118. The operator of a vehicle may generate the torque commands via a user interface, such as a throttle, a pedal, a controller 266, or other control device. The generated torque commands may be a control data message, such as a speed control data message, a voltage control data message, or a torque control data message. The vehicle data bus 118 may provide data bus messages with torque commands to the torque command generation module 105 via the first data port 268. Various other inputs and/or messages may be received by the torque command generation module 105.

The electronic data processing system 120 may include other input devices configured to allow a user to interact with any of the components of system, such a number pad, a keyboard, or a cursor control device, such as a mouse, or a joystick, touch screen display, remote control or any other device operative to interact with the computer system. In at least this way, the torque command generation module 105 may be associated with or supported by the first data port 268 of the electronic data processing system 120.

Alternatively or additionally, inverter switching circuit 188 may be coupled to the data bus 262 such as, for example, a second data port 270, which may in turn be coupled to the data bus 262. Additionally or alternatively, the sensor 115 and/or the primary processing module 114 may be coupled to a third data port 272, which in turn may be coupled to the data bus 262. Additionally or alternatively, the sensing circuit 124 may be coupled to the analog-to-digital converter 122, which may be coupled to a fourth data port 274. Additionally or alternatively, the terminal voltage feedback module 108 may be coupled to the fifth data port 276, which in turn may be coupled to the data bus 262.

While the data ports are designated first, second, third, etc., no order may be attached to the data ports, and more or less inputs and/or components may be attached to any one data port, and/or one or more data ports may be combined into one data port.

The data ports may facilitate providing inputs to the electronic data processing system 120. Though not shown, the control system and/or electronic data processing system 120 may further include a display unit, such as a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor, or specifically as an interface with the software stored in the memory or in the drive unit.

Additionally, the electronic data processing system 120 and/or control system may also include a disk or optical drive unit. The disk drive unit may include a computer-readable medium in which one or more sets of instructions, e.g. software, can be embedded. Further, the instructions may embody one or more of the methods or logic as described herein. In a particular embodiment, the instructions may reside completely, or at least partially, within the memory and/or within the processor during execution by the computer system. The memory and the processor also may include computer-readable media as discussed above.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual, computer system processing can be constructed to implement one or more of the methods or functionality as described herein.

In some systems, a motor 117 may be controlled in a maximum torque-per-voltage (MTPV) mode when a motor speed is beyond a base speed. In these systems, optimum motor (or machine) operating points may be tuned from a characterization procedure such that terminal voltage or voltage command ($v_{term}$) is just below an available voltage limit ($v_{limit}$) with moderate rotor magnet temperature. The voltage command may be referred to as a terminal voltage, terminal voltage command, and/or terminal voltage, and may refer to the voltage command sent from the inverter switching circuit 188 to the motor 117.

In motors 117 powered and/or controlled by generation modules 112, such as a space-vector PWM generation module 112, the voltage limit ($V_{limit}$) may be identified and/or expressed as follows:

$$V_{limit} = V_{dc}/\sqrt{3}$$

where the $V_{dc}$ is a supply voltage, such as a dc bus voltage, which may be supplied to, and/or used to power the inverter switching circuit 188 and/or the motor 117. This voltage limit may represent a maximum amount of power which may be available to the inverter switching circuit 188 for use with powering or controlling the motor 117. In some systems, calculation of the voltage limit may be identified and/or expressed as follows:

$$V_{limit} = (\text{percentage coefficient})(V_{dc}/\sqrt{3})$$

where the percentage coefficient may be a value between 0 and 1. The percentage coefficient may be, for example 95%, or 0.95. Multiplying ($V_{dc}/\sqrt{3}$) by the percentage coefficient may provide for a buffer and/or precautionary value, which may help avoid current regulation failures. This action may also prevent circumstances where the motor is operating at temperatures which are slightly different than those expected and/or assumed, and which may affect components in the measurement.

The terminal voltage commands from the current regulation controller 111 may be expressed as:

$$v_d^* = (i_d^* - i_d)*(k_{pd} + (k_{id}/s)) - \omega_e L_q i_q$$

$$v_q^* = (i_q^* - i_q)*(k_{pq} + (k_{iq}/s)) + \omega_e L_d i_d + \omega_e \lambda_f$$

where $i_d^*$ and $i_q^*$ are dq-axis current commands received from the summation module 119; $i_d$ and $i_q$ are actual current of the motor 117, such as the actual current as converted and output from the secondary processing module 116 and/or phase converter 113; $k_{pd}$ is a proportional gain coefficient for d-axis current regulation PI controller loop; $k_{pq}$ is a proportional gain coefficient for q-axis current regulation PI controller loop; $k_{id}$ is an integral gain coefficient for d-axis current regulation PI controller loop; and $k_{iq}$ is an integral gain coefficient for q-axis current regulation PI controller loop; 1/s is the continuous domain integrator; $\omega_e$ is an electrical frequency; $L_d$ is a d-axis phase inductance; $L_q$ is a q-axis phase inductance; and $\lambda_f$ is the motor back emf strength. The first portion of each equation (such as $(i_d^* - i_d)*(k_{pd} + (k_{id}/s))$) for $v_d^*$) is a current error ($i_d^* - i_d$) multiplied by a PI controller. The second portion (such as $\omega_e L_q i_q$ for $v_d^*$) is referred to as a feedforward item for each of the d-axis and q-axis voltage command.

As such, the voltage command generated by the current regulation controller 111 may therefore be calculated as:

$$V_{term}^* = \text{square root}((v_d^*)^2 + (v_q^*)^2)$$

If the voltage command ($v_{term}$) exceeds the maximum voltage limit ($V_{limit}$), current regulation may become saturated and/or lead to poor control performance. A number of root causes may lead to these situations where the controller voltage command ($v_{term}^*$) is greater than the maximum voltage limit ($V_{limit}$).

For example, a permanent magnet material which may be used with the motor 117 may have negative temperature coefficients, such as a negative temperature coefficient of 0.09%-0.12% per degree Celsius. When the motor 117 is operated at a high speed while staying at cold temperatures, previously tuned operating points at moderate magnet temperatures may require a higher voltage. This higher and/or additional voltage command may be required due to the stronger magnetic strength, and/or stronger back emf strength (greater $\lambda_f$), at the colder temperatures. Accordingly, the controller voltage command ($v_{term}^*$) in these systems may have a tendency to exceed the available voltage limit ($V_{limit}$).

As another example, in some systems, as a rotor magnet temperature may vary, controller current commands may be adaptively adjusted in an attempt to mitigate the shaft torque variations. These attempts to adjust the current commands could result in an accidental demand for more voltage than the dc bus voltage can support. As such, the controller voltage command ($v_{term}^*$) in these systems may also have a tendency to exceed the available voltage limit ($V_{limit}$).

As a third example, in some systems, a controller current command may experience a dramatic and/or sudden change due to fast and/or otherwise dynamic requirements. In these circumstances, the current regulation controller 111 may command more terminal voltage ($v_{term}^*$), which may overflow current regulation. These circumstances, where the controller voltage command ($v_{term}^*$) exceeds the available voltage limit ($V_{limit}$), may lead to catastrophic current regulation collapses.

As mentioned, the terminal voltage feedback module 108 may be implemented and/or used to provide an adjustment factor or adjustment command which may alter the terminal voltage commands used for the motor 117. The adjustment factor or adjustment command from the terminal voltage feedback module 108 may assist in, account for, correct for, and/or protected against the situation where the controller voltage command ($v_{term}$*) exceeds the available voltage limit ($V_{limit}$).

A review of the actual terminal voltage of the motor 117 is useful determining how to design and/or operate the terminal voltage feedback module 108. The actual terminal voltage of the motor 117 may be identified and/or expressed as:

$$v_d = (r_s i_d) + d/dt(L_d i_d) - \omega_e L_q i_q$$

$$v_q = (r_s i_q) + d/dt(L_q i_q) + \omega_e L_d i_d + \omega_e \lambda_f$$

Accordingly, one method to bring down the terminal voltage command $v_{term}$* below the $V_{limit}$ may be to increase the d-axis current ($i_d$) in its magnitude.

The terminal voltage feedback module 108 may monitor, sample, observe, sense, and/or otherwise receive the voltage commands sent by the current regulation controller 111 to the generation module 112. These voltage commands, ($v_d$*, $v_q$*) may be received by the terminal voltage feedback module 108, which may generate and/or calculate the $v_{term}$* as described above. Alternatively, $v_{term}$* may have been calculated and/or otherwise determined prior to being received by the terminal voltage feedback module 108, such as by the current regulation controller 111 or another component.

In addition to receiving the voltage commands and/or the terminal voltage command, the terminal voltage feedback module 108 may also monitor, sample, observe, sense, and/or otherwise receive the supply voltage ($V_{dc}$), or a signal representing a value for the supply voltage, that is available to the inverter switching circuit 188 and/or the generation module 112. Using this supply voltage value ($V_{dc}$), the terminal voltage feedback module 108 may calculate, identify, and/or generate the voltage limit, such as using the equation previously described. As mentioned, in some systems, the voltage limit may be calculated to account for small variations, and/or to provide a small buffer voltage. These systems may use a percentage coefficient. Alternatively, $V_{limit}$ may have been calculated and/or otherwise determined prior to being received by the terminal voltage feedback module 108, such as by the current regulation controller 111 or another component.

One or both of the $v_{term}$* and $V_{limit}$ may be calculated and/or determined, for example, every pulse width modulated cycle. In this way, the system may, for example, account for variations in the supply voltage. Alternatively, these values may be calculated and/or determined in other time intervals.

Where the $v_{term}$* is less than or equal to the $V_{limit}$, no adjustment factor may be necessary. This may result because the terminal voltage feedback module 108 may not be designed to decrease flux weakening below its feedforward nominal level when voltage commands are less than the voltage limit. In these circumstances, enough voltage may be available to the inverter switching circuit 188 and/or generation module 112 that the command $v_{term}$* may be executed with no required adjustments. Here, the nominal flux weakening level may already be determined from the motor 117 characterization stage and correspond to one or more minimum copper loss operation points. Accordingly, the terminal voltage feedback module 108 may either output a zero signal or not output any signal to either the current adjustment module 107 or the summer 119. In these circumstances, the current command from the dq-axis current generation module 109 may be received and transmitted to the current regulation controller 111.

Where, on the other hand, the $v_{term}$* is greater than the $V_{limit}$, the terminal voltage feedback module 108 may output an adjustment signal, command, factor, data and/or instruction (adjustment command). The terminal voltage feedback module 108 may create this adjustment command to apply additional flux weakening to limit the voltage command. The adjustment command may include information and/or data indicating and/or requiring that an adjustment to the current command being input to the current regulation controller 111 needs to be modified or otherwise altered. The adjustment command may include information and/or data indicating an amount by which the current regulation controller 111 needs to be modified or otherwise altered. The adjustment command may be a current command signal itself, such as an adjustment current command signal, which may be summed by a summation module 119.

While the comparison may refer to whether the terminal voltage command is greater than, or less than or equal to, the voltage limit, in some systems, the comparison may instead be whether the terminal voltage is greater than or equal to, or less than, the voltage limit. In systems and methods herein where "greater than" is used, it should be understood that the system and method may be modified to instead require a "greater than or equal to" comparison, and vice versa. Similarly, in systems and methods described herein where "less than" is used, it should be understood that the system and method may be modified to instead require a "less than or equal to" comparison, and vice versa.

In some embodiments, the adjustment command from the terminal voltage feedback module 108 may represent a d-axis current adjustment only. This may be because, as mentioned, adjusting the d-axis current may be sufficient and/or preferred for flux weakening, and/or lowering the terminal voltage command generated by the current regulation controller 111.

As mentioned, the adjustment command may be sent to the current adjustment module 107. The current adjustment module 107 may also gather adjustment information from the rotor magnet temperature estimation module 104 and/or the current shaping module 106, and aggregate all of the adjustment information together to form one adjustment current command to be sent to the summer 119. For example, one or more of the rotor magnet temperature estimation module 104, the current shaping module 106, and/or the terminal voltage feedback module 108 may send raw adjustment data which the current adjustment module 107 may use to generate the current adjustment command, such as by using look up tables, algorithms, rules, and/or other decision-making devices and/or logic. Additionally or alternatively, one or more of the rotor magnet temperature estimation module 104, the current shaping module 106, and/or the terminal voltage feedback module 108 may send a command which may itself be of a form suitable to be sent to the summation block 119. The current adjustment module 107 may then simply gather these commands and send one aggregate command to the summer 119.

In systems where one or more of the rotor magnet temperature estimation module 104, the current shaping module 106, and/or the current adjustment module 107 are not included and/or disabled, the adjustment current command of the terminal voltage feedback module 108 may be directly sent to the summer 119.

The summer 119 may also receive the current command from the dq-axis current generation module. The summer 119 may receive the adjustment current command received, and add it to a current command from the current generation module 109. The resulting current command may then be sent to the current regulation controller 111 for generation of the voltage command to drive the motor 117. In at least this way, the terminal voltage feedback command 108 may aid in and/or prevent circumstances where the terminal voltage command is greater than a voltage limit.

Figure 3:
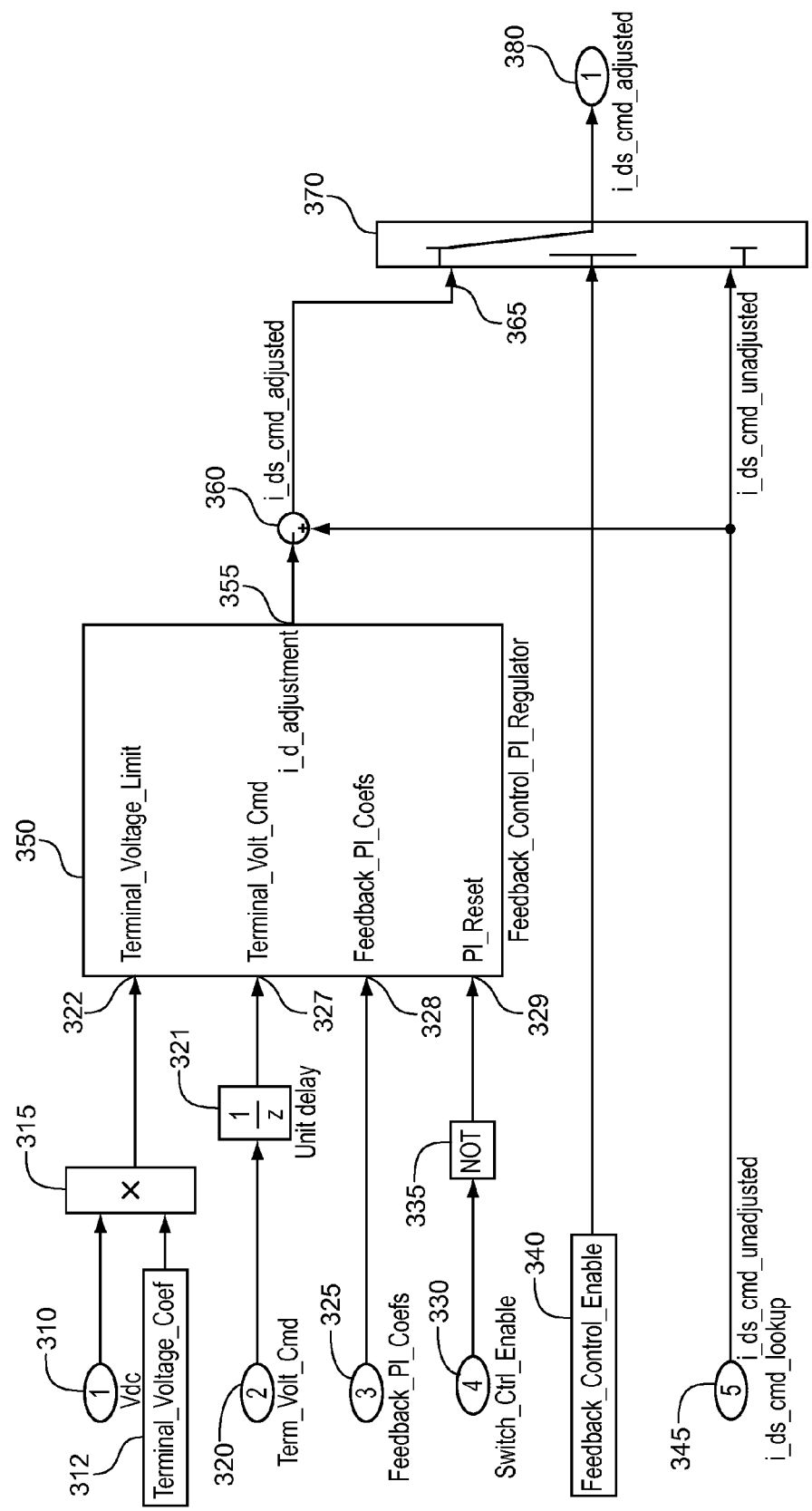
FIG. 3 is a circuit diagram for a feedback control component of a control system.

FIG. 3 depicts a circuit drawing of some of the logic, components, and/or functionality of a proportional-integral controller (PI controller) for use and/or implementation with the terminal voltage feedback module 108. The PI controller may be found in the terminal voltage feedback module 108, or separately from the terminal voltage feedback module 108. The PI controller may be used during an adjustment portion of operation of the terminal voltage feedback module 108, such as when the terminal voltage feedback module 108 is creating an adjustment command.

In FIG. 3, the supply voltage 310 received by the terminal voltage feedback module 108 (denoted Vdc) is identified as an input. The supply voltage 310 is multiplied, at multiplication block 315, by a terminal voltage coefficient 312, denoted Terminal_Voltage_Coef, which may be $1/\sqrt{3}$, $0.95/\sqrt{3}$, or various other coefficients. The resulting voltage limit $V_{limit}$ 322, denoted as Terminal_Voltage_Limit in FIG. 3, is fed into the feedback control PI regulator (or controller) 350. The PI controller 350 may, for example, be an anti-wind up PI controller.

The terminal voltage command 320, denoted as Term_Volt_Cmd, is fed to a 1/z unit delay block 321. The 1/z unit delay block 321 acts as a way of obtaining the terminal voltage command 320 from the previous control iteration and sending it to the PI controller.

In the terminal voltage feedback module 108, one or more feedback PI coefficients 325, denoted Feedback_PI_Coefs, are also inputted into the PI controller. For example, the feedback PI coefficients may include proportional gain coefficients such as $k_p$; and/or may include integral gain coefficients such as $k_i$.

The terminal voltage feedback module 108 shown in FIG. 3 may also include a switch control enable input 330, denoted as Switch_Ctrl_Enable in FIG. 3. The switch control enable input 330 is fed to a NOT block 335 before inputting the result into the PI controller 350. In this embodiment, the PI controller 350 may reset when the switch control enable input 330 is set to zero, and is not reset when the input 330 is one. The switch control enable input 330 may also be used to turn on or turn off the drive, which a high signal turning on the drive, and a low signal turning off the drive. Other embodiments are possible.

A d-axis current command ($i_d$*) lookup value 345 may be denoted as i_ds_cmd_unadjusted. This may be the current command received from the dq-axis current generation module 109.

An output from the PI controller 350 may be a d-axis adjustment command 355, and may be denoted i_d_adjustment. The d-axis adjustment command 355 outputted from the PI controller 350 may be added with current command input 345 at a summation block 360 to create an adjusted d-axis current command 365, denoted as i_ds_cmd_adjusted. The summation block 360 may be, for example, the summation block 119 in FIG. 1.

Because a d-axis current command from the dq-axis current generation manager 109 is always negative, and because the output of the PI Controller 350 is positive, the summation block 360 may have a negative d-axis adjustment command 355. This is because, for example, where the $i_d$* current command 345 from the dq-axis current generation manager 109 is −300 A, and where the output from the PI Controller 350 is 40 A, the resulting adjusted d-axis current command should be −340 A, not −260 A. As a result, the sign of the PI Controller output 355 is reversed before and/or during the addition with the d-axis current command 345 from the dq-axis current generation manager 109.

A feedback control enable input 340 may also be included. The feedback control enable input 340 may control whether or not the feedback logic of the terminal voltage feedback module 108 is to be incorporated in the current adjustment module 107 for the control system. If the feedback control enable input is set to zero, there may be no adjustments to the current command 345 identified from the dq-axis current generation module 109. In this situation, the switch in FIG. 3 may enable the bottom input, the d-axis command 345, to be output 380. Accordingly, the current command generated by the dq-axis current generation module 109 may be directly fed, transmitted, sent, and/or otherwise communicated to the current regulation controller 111. However, if the feedback control enable input 340 is set to one, the adjustment and/or feedback logic of the terminal voltage feedback module 108 may be enabled. In these circumstances, the d-axis adjusted current command 365, which results from the summation block 360, may be output to the command regulation controller 111.

Figure 4:
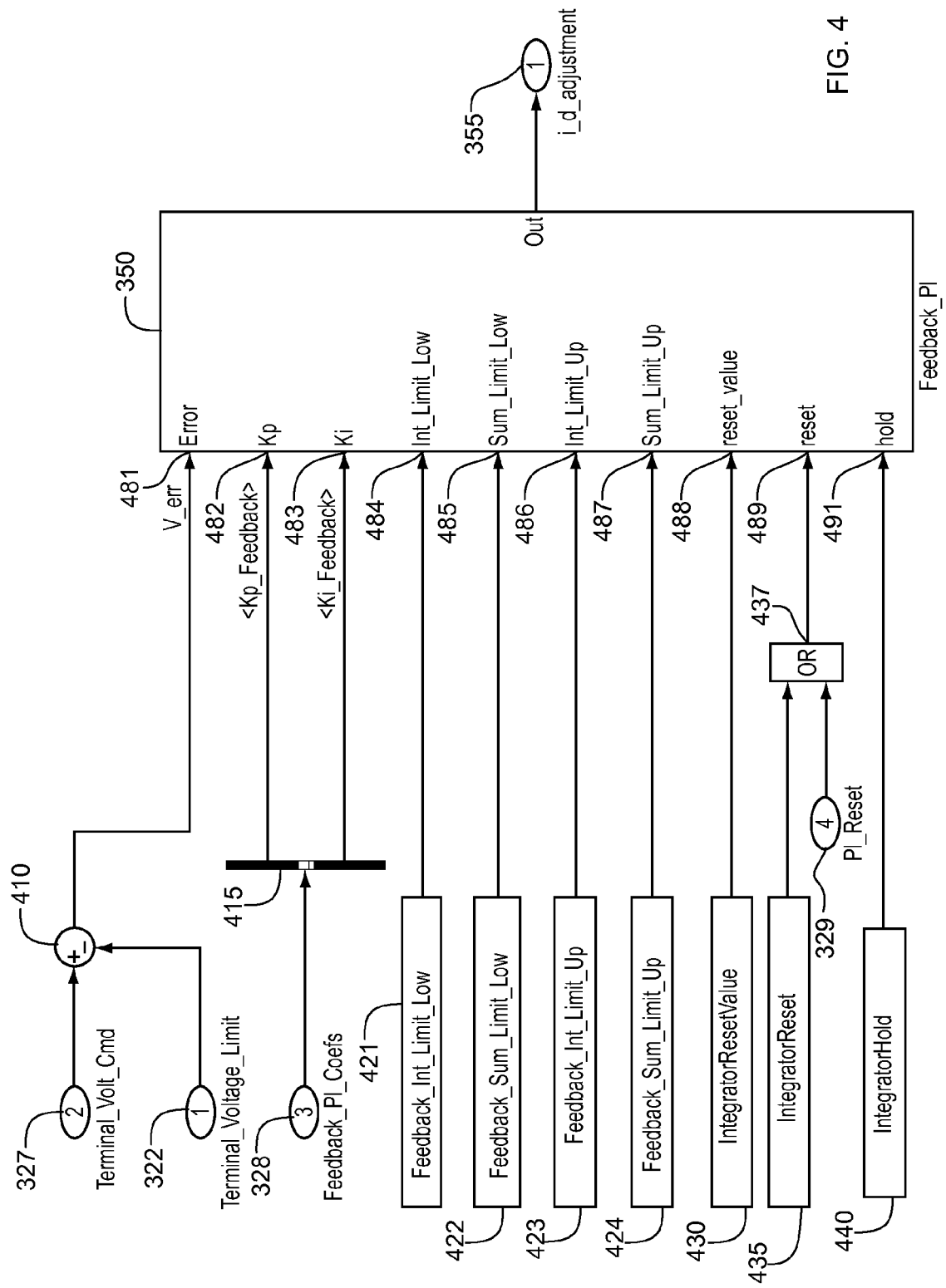
FIG. 4 is a circuit diagram of a proportional-integral controller of a control system.
Figure 5:
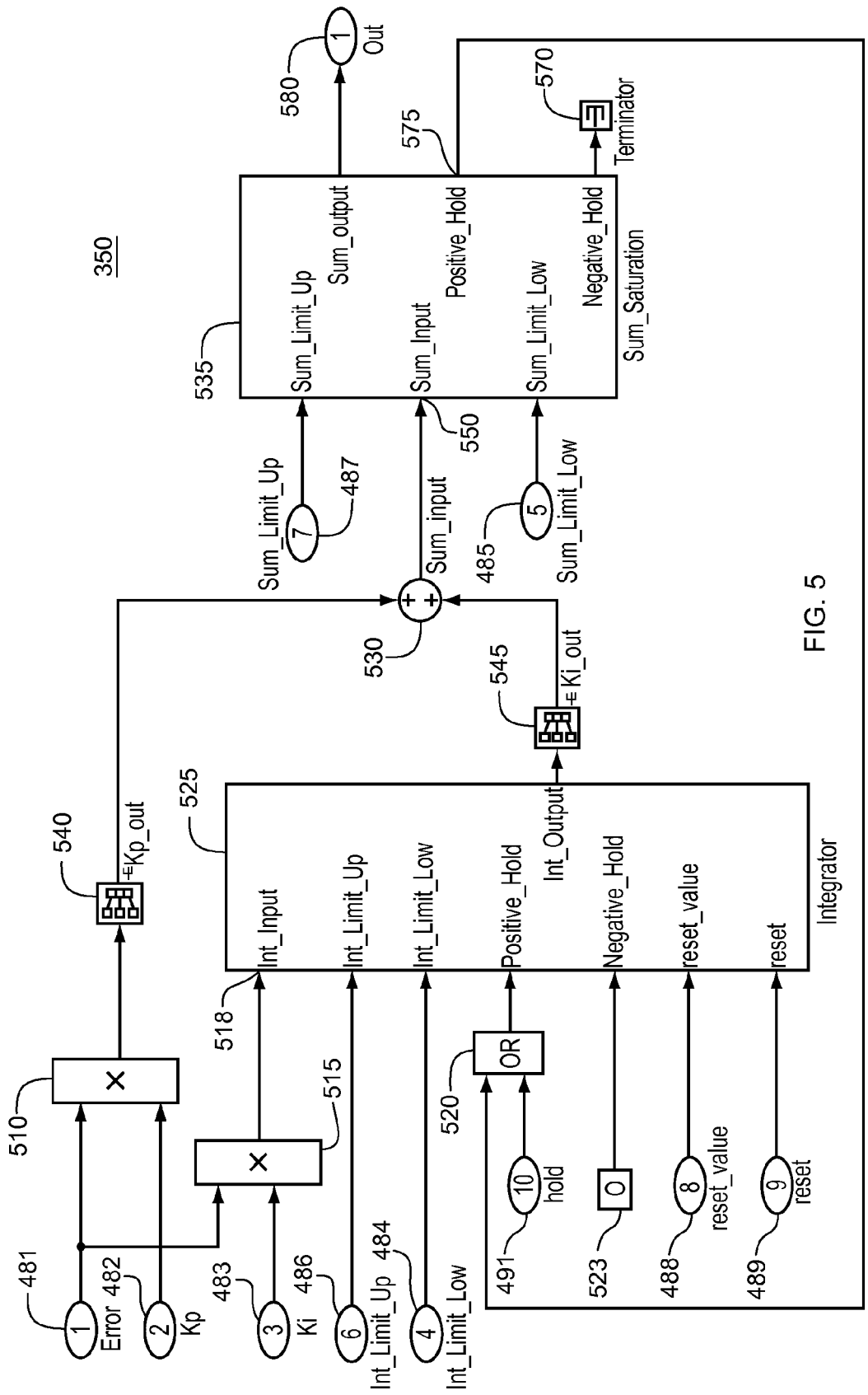
FIG. 5 is a circuit diagram of the proportional-integral controller of a control system.

FIGS. 4 and 5 illustrate circuit drawings of the logic, components, and/or functionality of the PI Controller 350 of FIG. 3, which may be used with an adjustment portion of the terminal voltage feedback module 108. The PI controller 350 may, for example, be used for comparing the terminal voltage command and the voltage limit. Other PI controllers may be used in other modules of the electronic data processing system 120, such as in the current regulation controller 111. FIG. 4 illustrates the inputs to the PI Controller 350, while FIG. 5 illustrates a more detailed view of the workings of the PI Controller 350.

In FIG. 4, the PI controller 350 may include a voltage error item $V_{err}$ 481 as an input. The voltage error item $V_{err}$ 481 may be determined by subtracting the voltage limit ($V_{limit}$) 322 from the terminal voltage command ($v_{term}$*) 327.

The PI controller 350 may also include as inputs the feedback PI coefficients 328, which may be $k_p$ 482 and $k_i$ 483, as previously discussed. PI controllers in other modules, such as a PI controller in a current regulation module 111, may have other coefficients, such as, for example, separate proportional and integral gain coefficients for each of the d-axis current ($k_{id}$; $k_{pd}$) and the q-axis current ($k_{iq}$, $k_{pq}$).

The PI controller 350 of FIGS. 4 and 5 may further include a lower feedback integration limit 421 and an upper feedback integration limit 423 as inputs 484 and 486 respectively, which may represent the limits for any integration performed by the PI controller 350.

The PI controller 350 may also include a lower feedback summation limit 422 and an upper feedback summation limit 424 as inputs 485 and 487 respectively, which may represent the limits for a summation of the PI controller 350.

The PI controller 350 may also include an integrator reset value 430, which may be input 488, and may represent a value which the PI integrator resets to when the reset component of the PI controller 350 is activated or enabled. This value may typically be zero, but can be set to various other values. The PI controller 350 may also include an integrator reset 435 and a PI reset 329, both connected to an OR block 437, such that if either is activated, an reset input 489 of the PI controller 350 may provide an enable or activate signal. The PI controller 350 may also include an integrator hold 440, which may be input 491 to the PI controller.

In FIG. 5, the PI controller 350 may operate as follows. The input error ($V_{err}$) 481 previously calculated may be multiplied by the proportional gain coefficient $k_p$ 482 in multiplication block 510 to obtain a gain-adjusted input error 540. This may also be referred to as an adjusted error output, or a proportional gain output.

In addition, the $V_{err}$ 481 may be multiplied by the integral gain coefficient of the PI controller 350 in multiplication block 515, and fed into the integrator 525 as an input 518. Integrator 525 may also be referred to as an integrator module or integrator block.

The integrator input 518 may be processed by the integrator 525. For example, the integrator input 518 may be added to a previous iteration stored output 545 where no holds are set for the integrator 525. In some integrators 525, the voltage error $V_{err}$ may first be multiplied by the $k_i$ coefficient to obtain the integrator input 518. After this, the product of the voltage error $V_{err}$ and the $k_i$ coefficient may be added to the previous step integrator output 545. This sum may then be compared to the upper and lower integrator limits.

Where the sum of the integrator input 518 and the previous iteration stored output 545 is greater than the integrator upper limit input 486, the integrator upper limit input 486 may be output from the integrator 525 as the present output 545. Where the sum of the integrator input 518 and the previous iteration stored output 545 is less than the integrator upper limit 486 but greater than the integrator lower limit 484, the sum of the integrator input 518 and the previous iteration stored output 545 may be output from the integrator 525 as the present output 545. Where the sum of the integrator input 518 and the previous iteration stored output 545 is less than the integrator lower limit 484, the integrator lower limit 484 may be output from the integrator 525 as output 545.

When the integrator 525 receives a positive hold signal indicating a positive hold should be instituted in the integrator 525, the integrator 525 may output the previous iteration stored output 545 as the present output 545 if the present integrator input 518 is positive. The positive hold signal may be, for example, a high signal or a 1, and may be instituted where no further positive integration is desired, such as when an upper limit has been reached.

In a general anti wind-up PI controller, a negative hold may similarly operate, such that when a high signal for the negative hold is received, no further negative integration may be desired if the present integrator input 518 is negative, and the previous iteration stored output 545 may be output as the present output 545.

The integrator output 545 from the integrator 525 may represent and/or be referred to as a limited output, an integrator module output, and/or an integral-gain-adjusted output 545.

The limited output 545 and the proportional gain output 540 may be summed together, such as by a summation block 530. The summation block 530 may also be referred to as a summer, an adder, or a summation module. The result may be a summation module result 550.

The summation module result 550 may be input into a sum saturation module 535. The sum saturation module may also have as inputs the sum upper limit 487 and the sum lower limit 485.

Where the summation module result 550 is greater than the sum upper limit 487, the sum upper limit 487 may be output from the sum saturation module 580 as the output. In addition, a high or 1 signal may be output at as a positive hold signal 575 back to the integrator 525 or to the block 520 as previously discussed. Where the summation module result 550 is less than the sum upper limit 487 but greater than the sum lower limit 485, the summation module result 550 may be output as output 580. Where the summation module result 550 is less than the sum lower limit 485, the sum lower limit may be output. Here, while a negative hold signal is normally output, because the negative hold of the integrator 525 has been disabled, the negative hold signal 570 is terminated.

The lower integration limit 484 and the sum lower limit 485 of the PI controller 350 may, in some embodiments, be set to zero. This may be because it may be desired that the system not output values below zero when the PI controller 350 would otherwise yield negative results.

The sum upper limit 487 and upper integration limit 486 may be set at between, about, and/or around 10-15% of the motor 117 characteristic current $I_{char}$. For example, the sum upper limit 487 and/or the upper integration limit 486 of an IPM motor may be set to around 10-15% of the IPM motor's characteristic current. Other configurations are possible. The characteristic current of the motor 117 may be identified and/or expressed as:

$$I_{char} = \lambda_f / L_d$$

where $\lambda_f$ is the back emf constant and $L_d$ is d-axis inductance.

The PI controller 350 of FIGS. 4 and 5 may differ from conventional anti wind-up PI controllers, however, in that the PI controller 350 may disable the negative hold sent to the integrator 525.

In conventional anti wind-up PI controllers, when the terminal voltage command is less than the voltage limit, proportional item 540 becomes negative. This may reduce a summation module result 550 to a lower value, which may be below the sum lower limit 485. In such circumstances, the sum saturation module 535 may output a high value for the negative hold which may be returned to the integrator 525.

However, this result in anti wind-up PI controllers may hold negative integration even in circumstances where the integrator output 545 is still positive. However, it may be desirable to continue to operate the integrator 525 until the value of the integrator 525 reaches the integrator lower limit 484, which may, for example, be set at zero. In the conventional anti wind-up PI controllers, this may not be possible, because the negative hold may stop the integrator 525 from performing further negative integration.

Because of this, the PI controller in FIG. 5 has disabled the negative hold, and provided a constant low, or zero, signal to the integrator 525. This allows the system to integrate from zero when the terminal voltage command exceeds the voltage limit again, which may produce favorable integration results. In other systems, another PI controller, such as a conventional PI controller, may be used.

As described above, the circuit drawings of the PI controller 350 in FIGS. 4 and 5 may be used with adjustment portion of the terminal voltage feedback module 108 to provide an accurate d-axis current adjustment command.

Figure 6:
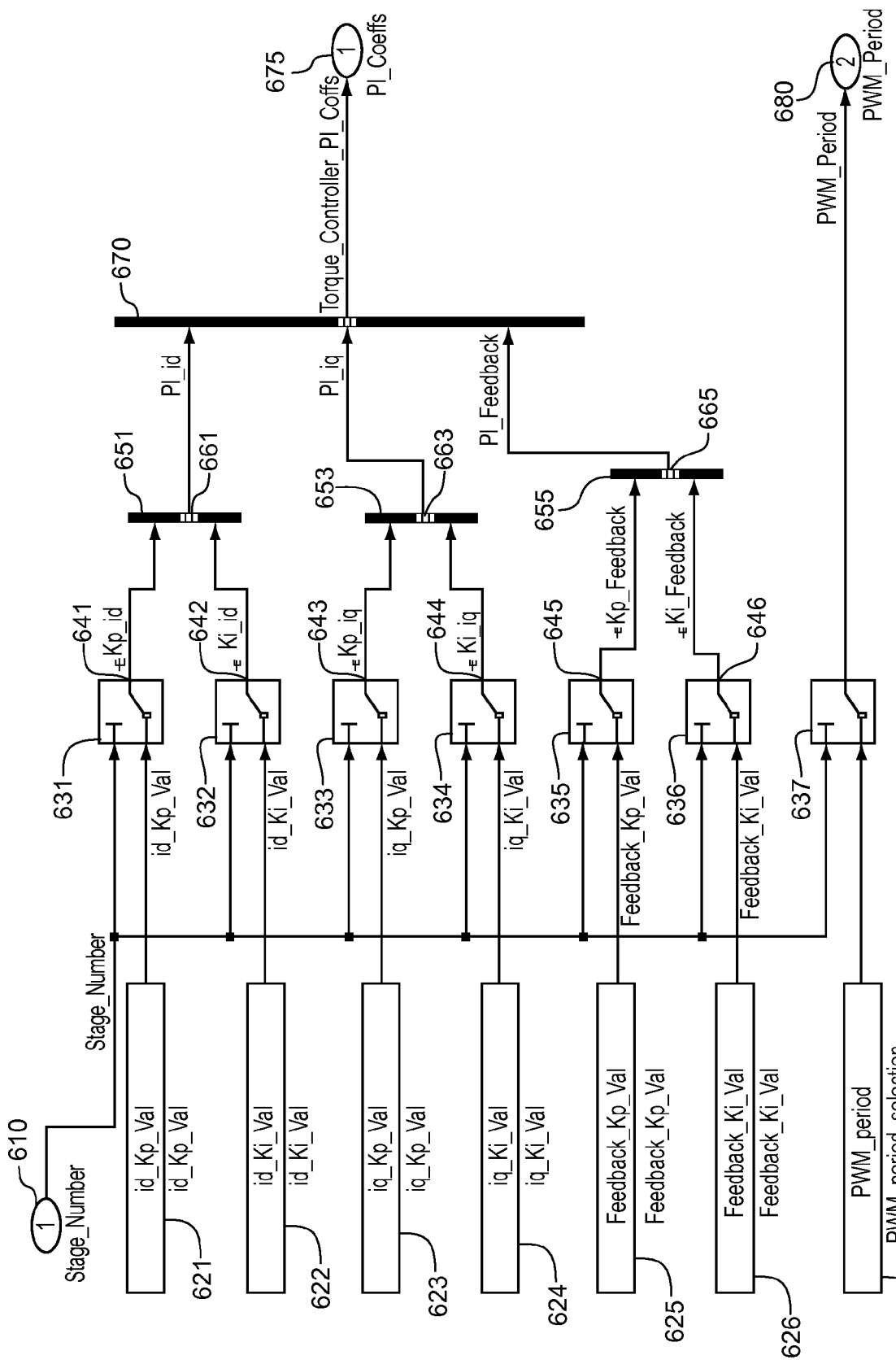
FIG. 6 is a circuit diagram of a system for selecting varying gains for a proportional-integral controller of a control system.

FIG. 6 shows a circuit drawing of how a plurality of values and/or coefficients of the PI controller 350 for the terminal voltage feedback module 108 may vary and/or be adjusted based on a speed of the motor 117.

The equations for the actual voltages of the motor 117 described above illustrate that at different motor speeds, d-axis current command adjustments may lead to different amounts of voltage reductions. Accordingly, the circuit drawing of FIG. 6 may be useful to implement varying PI gains for the terminal voltage feedback module 108.

In particular, the circuit drawing of FIG. 6 may be useful for adjusting and/or controlling values such as the $k_{pd}$, $k_{pq}$, $k_{id}$, $k_{iq}$ a feedback $k_p$ value, a feedback $k_i$ value, and/or a pulse width modulation period selection. For example, the circuit shown may be useful in adjusting a feedback $k_p$ value and a feedback $k_i$ used in the terminal voltage feedback module, as well as $k_{pd}$, $k_{pq}$, $k_{id}$, $k_{iq}$ used in different control modules such as in the current regulation controller 111. Other configurations with fewer or more controlled values are possible.

FIG. 6 shows an array for each of these features. For example, the array 621 refers to an array for a proportional gain coefficient for d-axis current regulation PI controller loop; array 622 refers to an array for an integral gain coefficient for d-axis current regulation PI controller loop; array 623 refers to an array for a proportional gain coefficient for q-axis current regulation PI controller loop; array 624 refers to an array for an integral gain coefficient for q-axis current regulation PI controller loop; array 625 is an array for a feedback proportional gain coefficient; array 626 is an array for a feedback integral gain coefficient; and array 627 is an array for a PWM period or PWM switching frequency. Each array 621-627 may have a list or table of values which may correspond to one of a plurality of stage numbers. The arrays 621-627 may be stored in and/or processed by the electronic data processing system 120. For example, in some systems, the arrays 621-624 may be stored and/or processed in the current regulation controller 111, and arrays 625-626 may be stored and/or processed in the terminal voltage feedback module 108, and the PWM period array 627 may be stored in and/or processed by the generation module 112. Other configurations are possible.

The circuit drawing of FIG. 6 includes a stage number 610. The stage number may correspond to a speed of the motor 117. The stage number may, for example, correspond directly to a measured speed, and/or may be a value selected based on the speed. For example, a stage number=1 may be input into the circuit drawing for all motor speeds with 0-1000 revolutions per minute (r.p.m.), a stage number=2 may be input for all motor speeds with 1001-2000 r.p.m., etc. Other methods and ways of selecting a stage number may be possible.

Based on an input stage number 610, at the select blocks 631-637, the value of each array 621-627 which corresponds to the input stage number 610 may be output at 641-647 respectively. For example, if an array 621 has a value of 2 corresponding to a stage number 0, a value of 4 corresponding to a stage number 1, a value of 8 corresponding to a stage number 2, etc., then if the stage number is 1, the output at 641 is 4.

The various outputs 641-646 may be combined. For example, the selected proportional gain coefficient for the d-axis current 641 may be combined with the selected integral gain coefficient for the d-axis current 642 in block 651 to obtain a PI d-axis value 661. Similarly, the selected proportional gain coefficient for the q-axis current 643 may be combined with the selected integral gain coefficient for the q-axis current 644 in block 653 to obtain a PI q-axis value 663. Also, the feedback proportional gain coefficient 645 may be combined with the selected feedback integral gain coefficient 646 in block 655 to obtain a PI feedback value 665. These three values 661, 663, 665 may be combined and/or used as torque command PI controller coefficients 675, such as when a torque command is fed into the torque command generation module 105.

Additionally, the selected PWM period or PWM switching frequency from select block 637 may be output as a PWM period or PWM switching frequency 680.

Accordingly, in these ways, the proportional gain and/or integral gain of the PI controller may be determined based on a speed range of the motor, and/or may be obtained from lookup tables or arrays.

In at least this way, the PI controller gain coefficients may be calculated, tuned, selected, and/or vary based on a speed of the motor 117.

In accordance with the circuit drawings shown in FIGS. 3-6, the terminal voltage feedback module 108 may be able to provide an adjustment command which may prevent a terminal voltage command $v_{term}$* from exceeding a voltage $V_{limit}$. This adjustment command, which may be an adjustment current command, an adjustment signal, an adjustment factor, and/or adjustment data, may be sent to the current adjustment module 107. The adjustment command from the terminal voltage feedback module 108 may be sent, fed, transmitted, and/or otherwise communicated to the current adjustment module 107.

Figure 7:
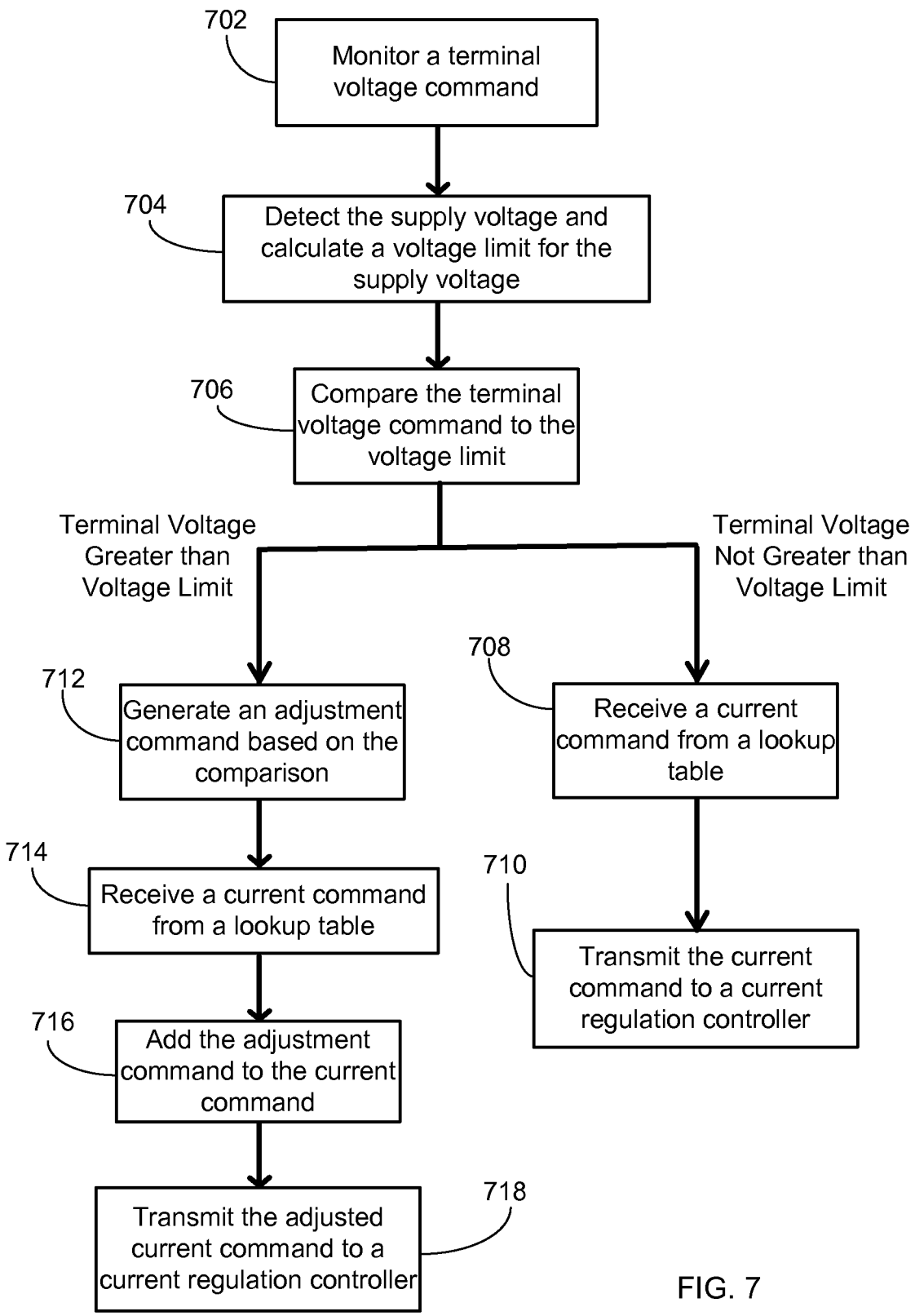
FIG. 7 is a flow diagram of a method of controlling a motor.

FIG. 7 shows a method of operating the terminal voltage feedback module 108 and other components of the control system. In block 702, a terminal voltage command may be monitored. For example, the terminal voltage feedback module 108 may monitor a voltage command ($v_d$*, $v_q$*) generated by the current regulation generator 111.

In block 704, a supply voltage may be detected. The supply voltage detected may be the supply voltage used to power the inverter switching circuit 188, the generation module 112, and/or the motor 117. Block 704 also includes calculating a voltage limit for the supply voltage. For example, the voltage limit may be calculated as previously described.

In block 706, the terminal voltage command may be compared to the voltage limit. The result of this comparison may determine which block is carried out next. This comparison may, for example, take place in the terminal voltage feedback module 108.

If the terminal voltage is greater than the voltage limit, the method may proceed to block 712, where an adjustment command is generated based on the comparison. The adjustment command may be generated in various ways as previously discussed, and may be carried out by the terminal voltage feedback module 108, the current adjustment module 107, or a combination of both.

From block 712, the method may continue to block 714, where a command current may be received from a lookup table. For example, a command current may be received by the summer 119 from the dq-axis current generation module 109.

In block 716, the adjustment command may be added to the current command. For example, the summer may receive both the current command and the adjustment command, and may add the two together to obtain an adjusted current command, as previously discussed.

In block 718, the adjusted current command obtained may be transmitted to a current regulation controller, such as current regulation controller 111. This may be done in a manner such as those previously discussed.

Returning to block 706, if the terminal voltage is not greater than the voltage limit, the method may proceed to block 708. In block 708, a current command may be received from a lookup table. This block may resemble block 714 previously discussed.

From block 708, the method may proceed to block 710, where the current command may be transmitted to the current regulation controller 111, in a manner similar or the same as those previously discussed.

The method of FIG. 7 shows monitoring a terminal voltage command (block 702) as preceding a detection of a supply voltage and calculation of a voltage limit (block 704). However, these blocks may be done in reverse order, or may be done simultaneously.

Block 714, as well as block 708, are shown as occurring after blocks 702, 704, and 706. In other systems and methods, however, blocks 708 and/or 714 may occur at any point before, during, or after the performance of blocks 703, 704 and/or 706.

Having described the preferred embodiment, it will become apparent that various modifications can be made without departing from the scope of the invention as defined in the accompanying claims.

We claim:

1. A control system for a motor comprising:
   a current regulation controller for generating a terminal voltage command used for converting a supply voltage to a three phase voltage to power a motor;
   a terminal voltage command feedback module for controlling the terminal voltage command, wherein the terminal voltage command feedback module compares the terminal voltage command to a determined voltage limit of the supply voltage and generates a d-axis current adjustment command in accordance with the comparison, the d-axis current adjustment command used for reducing the terminal voltage command below the determined voltage limit; and
   a summer coupled with the terminal voltage command feedback module, wherein the summer adds the d-axis current adjustment command to a d-axis current command received from a lookup table.

2. The control system of claim 1, wherein the determined voltage limit is determined every pulse-width modulation cycle based on a detected supply voltage.

3. The control system of claim 1, wherein the terminal voltage command feedback module generates the d-axis current adjustment command when the terminal voltage command is greater than the determined voltage limit.

4. The control system of claim 1, further comprising a pulse width modulation generation module coupled with the current regulation controller, wherein the pulse width modulation generation module receives the terminal voltage command and generates a three phase voltage command based on the terminal voltage command to power the motor.

5. The control system of claim 4, wherein the supply voltage is a dc bus voltage used to power the pulse width modulation generation module.

6. The control system of claim 1, wherein the determined voltage limit is calculated by dividing a magnitude of the supply voltage by $\sqrt{3}$, and multiplying the result by a percentage coefficient.

7. The control system of claim 6, wherein the percentage coefficient comprises about 0.95.

8. An anti-wind up proportional-integral controller for a voltage feedback control module used with a motor, comprising:
   an integrator module including an integrator input, an integrator upper limit input, an integrator lower limit input, a positive hold input, and a negative hold input;
   a summation module connected with the integration module for summing a limited output of the integrator module and a proportional gain output to obtain a summation module result;
   a sum saturation module connected with the summation module and including a sum upper limit and a sum lower limit, the sum saturation module configured to output the summation module result when the summation module result is less than the sum upper limit and greater than the sum lower limit, to output the sum lower limit when the summation module result is less than the sum lower limit, to output the sum upper limit when the summation module result is greater than the sum upper limit, and to output a positive hold signal to the positive hold input of the integrator module when the summation module result is greater than the sum upper limit, wherein the integrator lower limit input is set to zero, the sum lower limit is set to zero, and the negative hold is disabled.

9. The anti-wind up proportional-integral controller of claim 8, wherein a proportional gain and an integral gain of the proportional-integral controller differ based on a speed of the motor.

10. The anti-wind up proportional-integral controller of claim 9, wherein the limited output of the integrator module represents a sum of a product of an input error and the integral gain value added to a previous step integrator output when the sum is less than the integrator upper limit input and greater than the integrator lower limit input, the integrator upper limit input when the sum is greater than the integrator upper limit input, and the integrator lower limit input when the sum is less than the integrator lower limit input.

11. The anti-wind up proportional integral controller of claim 10, wherein the integrator upper limit input and the sum upper limit are set at about 10-15% of a characteristic current of the motor.

12. The anti-wind up proportional integral controller of claim 9, wherein the proportional gain output represents a product of an input error and the proportional gain value.

13. The anti-wind up proportional integral controller of claim 9, wherein the proportional gain and the integral gain are obtained from lookup tables, and are determined based on a speed range of the motor.

14. A method of controlling a motor comprising:
   monitoring a terminal voltage command generated by a current regulation controller;
   comparing the terminal voltage command to a voltage limit of a supply voltage;
   generating an adjustment command based on the comparison;
   adding the adjustment command to a current command obtained from a lookup table to create an adjusted current command; and
   transmitting the adjusted current command to the current regulation controller.

15. The method of claim 14, further comprising:
   detecting the supply voltage within every pulse-width modulation cycle; and
   calculating the voltage limit within every pulse-width modulation cycle based on the detected supply voltage.

16. The method of claim 14, further comprising generating the terminal voltage command based on the adjusted current command.

17. The method of claim 14, wherein the terminal voltage command and the voltage limit are compared with a proportional-integral controller.

18. The method of claim 17, wherein the proportional-integral controller is modified so that an integrator lower limit is set to zero, a sum lower limit is set to zero, and a negative hold input is disabled.

19. The method of claim 14, wherein the adjustment command is generated when the terminal voltage command is greater than the voltage limit.

* * * * *

UNITED STATES PATENT AND TRADEMARK OFFICE
CERTIFICATE OF CORRECTION

| | | |
|---|---|---|
| PATENT NO. | : 8,450,962 B2 | Page 1 of 1 |
| APPLICATION NO. | : 13/036953 | |
| DATED | : May 28, 2013 | |
| INVENTOR(S) | : Long Wu and Robert Shaw | |

It is certified that error appears in the above-identified patent and that said Letters Patent is hereby corrected as shown below:

On the Title Page

Item (73) should read, Assignee: Deere & Company, Moline, IL (US)

Signed and Sealed this
First Day of October, 2013

Teresa Stanek Rea
*Deputy Director of the United States Patent and Trademark Office*